(12) United States Patent
Ando et al.

(10) Patent No.: US 7,373,075 B1
(45) Date of Patent: *May 13, 2008

(54) RECORDING METHOD OF STREAM DATA AND DATA STRUCTURE THEREOF

(75) Inventors: Hideo Ando, Hino (JP); Kazuyuki Uyama, Kumagaya (JP); Yuuji Ito, Tokyo (JP); Shinichi Kikuchi, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1062 days.

This patent is subject to a terminal disclaimer.

(21) Appl. No.: 09/666,129

(22) Filed: Sep. 20, 2000

Related U.S. Application Data

(63) Continuation of application No. PCT/JP00/01653, filed on Mar. 17, 2000.

(30) Foreign Application Priority Data

Mar. 17, 1999 (JP) ................................. 11-072077

(51) Int. Cl.
*H04N 5/91* (2006.01)
(52) U.S. Cl. ............................ 386/68; 386/70; 386/94; 386/95; 386/125
(58) Field of Classification Search .................. 386/46, 386/65, 95, 68, 70, 125–126, 109–112, 94
See application file for complete search history.

(56) References Cited

U.S. PATENT DOCUMENTS

| 5,596,564 | A | * | 1/1997 | Fukushima et al. | ........... 386/70 |
|---|---|---|---|---|---|
| 6,002,834 | A | * | 12/1999 | Hirabayashi et al. | ......... 386/70 |
| 6,047,103 | A | * | 4/2000 | Yamauchi et al. | ............ 386/94 |
| 6,169,843 | B1 | * | 1/2001 | Lenihan et al. | ............... 386/46 |
| 7,006,757 | B2 | * | 2/2006 | Ando et al. | ................... 386/94 |

FOREIGN PATENT DOCUMENTS

| EP | 0 696 798 | 2/1996 |
|---|---|---|
| EP | 0 899 968 | 3/1999 |
| JP | 5-74053 | 3/1993 |
| JP | 7-211048 | 8/1995 |
| JP | 7-284065 | 10/1995 |
| JP | 8-195072 | 7/1996 |
| JP | 08-195072 | 7/1996 |
| JP | 8-223531 | 8/1996 |
| JP | 8-235832 | 9/1996 |
| JP | 8-289248 | 11/1996 |

(Continued)

*Primary Examiner*—Vincent F. Boccio
(74) *Attorney, Agent, or Firm*—Oblon, Spivak, McClelland, Maier & Neustadt, P.C.

(57) ABSTRACT

An information medium which has a data area for recording stream data (SOB) using stream packets each of which includes an application packet area, and a management area for recording management information that pertains to the stream data (SOB) is used. The stream data (SOB) are distributed and recorded in the application packet areas in a plurality of the stream PES packets. When the start portion of the application packet area included in the first stream PES packet in the stream data (SOB) does not match the first byte of a time stamp appended to the first application packet in the application packet area, then information is recorded so that they match.

4 Claims, 18 Drawing Sheets

FOREIGN PATENT DOCUMENTS

| | | |
|---|---|---|
| JP | 8-289250 | 11/1996 |
| JP | 08-339637 | 12/1996 |
| JP | 9-50675 | 2/1997 |
| JP | 9-106631 | 4/1997 |
| JP | 09-139914 | 5/1997 |
| JP | 9-139914 | 5/1997 |
| JP | 9-213011 | 8/1997 |
| JP | 09-214845 | 8/1997 |
| JP | 09-251762 | 9/1997 |
| JP | 9-306146 | 11/1997 |
| JP | 10-200854 | 7/1998 |
| JP | 10-334615 | 12/1998 |
| JP | 11-7753 | 1/1999 |
| JP | 11-45518 | 2/1999 |
| JP | 11-73737 | 3/1999 |
| JP | 11-073737 | 3/1999 |
| JP | 2000-195170 | 7/2000 |
| JP | 2000-215651 | 8/2000 |
| JP | 2000-217066 | 8/2000 |

\* cited by examiner

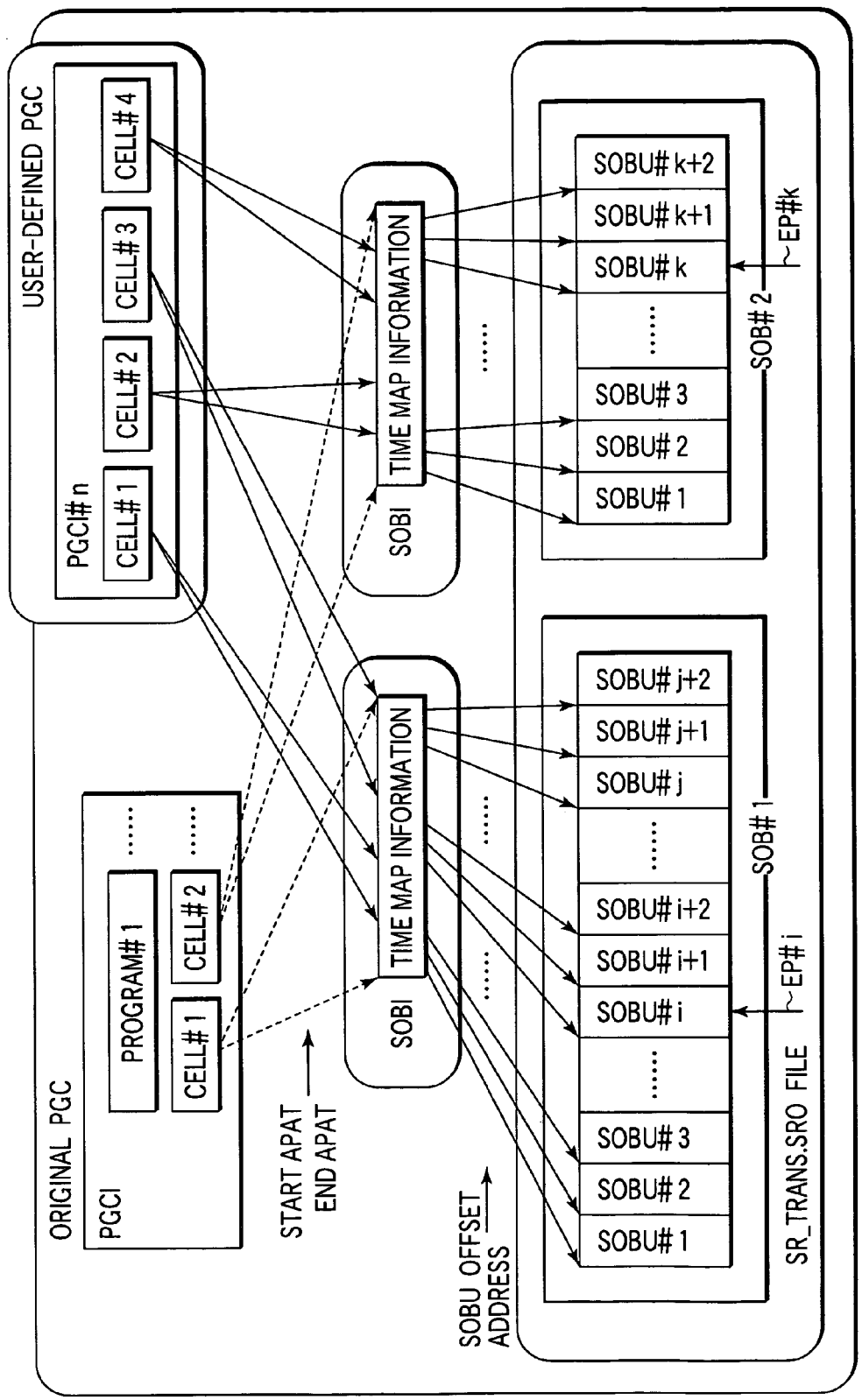
F I G. 18

US 7,373,075 B1

RECORDING METHOD OF STREAM DATA AND DATA STRUCTURE THEREOF

CROSS REFERENCE TO RELATED APPLICATIONS

This is a continuation of Application No. PCT/JP00/01653, filed Mar. 17, 2000.

This application is based upon and claims the benefit of priority from the prior Japanese Patent Application No. 11-072077, filed Mar. 17, 1999, the entire contents of which are incorporated herein by reference.

BACKGROUND OF THE INVENTION

The present invention relates to a method of recording video data sent in digital broadcast or the like or stream data sent with a packet structure, a data structure of stream data suitable for this recording method, and information medium on which information is recorded using this data structure.

In recent years, TV broadcast has come into the era of digital broadcast. Accordingly, an apparatus for saving digital data of digital TV broadcast as they are irrespective of their contents, i.e., a so-called streamer, has been demanded.

The current digital TV broadcast uses an MPEG transport stream. In the future, an MPEG transport stream will be used as a standard one in the field of digital broadcast using moving picture.

In such digital broadcast, the contents (mainly, video information) to be broadcasted are time-divided into groups of data each having a predetermined size (e.g., 188 bytes) called transport packets, and broadcast data is sent in units of transport packets.

As a streamer for recording digital broadcast data, a home digital VCR such as D-VHS (digital VHS) or the like is currently commercially available. A streamer using D-VHS directly records a broadcasted bitstream on a tape. For this reason, a plurality of programs are multiplexed and recorded on a video tape.

Upon playback, all data are output from the VCR to a set-top box (digital TV reception apparatus; to be abbreviated as an STB hereinafter) when they are played back either from the beginning or the middle of the tape. In this STB, a desired program is selected from the output data by user operation or the like. The selected program information is transferred from the STB to a digital TV receiver, and is played back (playback of video plus audio and the like).

Since this D-VHS streamer uses a tape as a recording medium, it cannot attain quick random access, and it is difficult to quickly jump to a desired position of a required program so as to play it back.

As a promising candidate that can combat such shortcoming (difficulty of random access) of the tape, a streamer that uses a large-size disc medium such as a DVD-RAM or the like has been proposed. In this case, management data must be inevitably recorded together with broadcast data in consideration of random access, special playback, and the like.

When a DVD-RAM disc is used as an information storage medium, data are recorded in units of 2,048-byte sectors. On the other hand, digital TV broadcast adopts an MPEG transport stream, and stream data each of which stores video information are sent in units of 188-byte transport packets as minimum units of the transport stream. The size of this transport packet differs depending on digital TV broadcast stations and, for example, a given digital TV broadcast station sends data in units of 130 bytes. When such received transport packets are recorded in units of sectors on an information storage medium such as a DVD-RAM disc or the like as they are, the following problems are posed. That is:

1. Since 2,048 bytes as the sector size are not an integer multiple of the transport packet size (e.g., 188 bytes), a recording method of transport packets in a sector poses a problem.

More specifically, when transport packets are allocated in a given sector in turn from the first one, and the remaining area formed in this sector is handled as a padding area, a large number of wasteful padding areas are generated in units of sectors. For this reason, the stream data size that can be recorded on the information storage medium decreases by the padding areas in units of sectors. As a result, the practical recording capacity of the information storage medium decreases.

2. Stream data that have been video-compressed according to the MPEG format must be decoded by a decoder after they are played back from the information storage medium. In this case, the time interval between neighboring transport packets to be transferred to the decoder must hold that immediately after they were received from a digital TV broadcast station. For this reason, time interval information of each transport packet upon being transferred to the decoder is required.

3. Since transport packets recorded on the information storage medium have no identification information for identifying individual transport packets, there is no means for designating a specific transport packet upon search or edit.

4. When a DVD-RAM disc is used as an information storage medium, since data are recorded in units of 2,048-byte sectors, it is difficult to implement a partial erase process in units of transport packets.

5. Since stream data sent in digital TV broadcast have been video-compressed in accordance with the MPEG format, decoding must be started from an I-picture position. Therefore, a partial erase process at a specific video position must be done to have an I-picture start position at the head position of the data as a boundary position in practice. However, in information obtained by merely recording transport packets in turn in sectors, it is difficult to implement a partial erase process using the I-picture start position as the boundary position.

It is an object of the present invention to provide a recording method that can efficiently record stream data.

It is another object of the present invention to provide a data structure that can efficiently manage stream data.

BRIEF SUMMARY OF THE INVENTION

In order to achieve the above object, a recording method according to the present invention uses an information medium (201) which has a data area (STREAM.VRO/SR_TRANS.SRO) for recording stream data (SOB) using stream PES packets each of which includes an application packet area that includes one or more application packets with time stamps (ATS), and a management area (STREAM.IFO/SR_MANGR.IFO) for recording management information (STRI) that pertains to the stream data (SOB).

The stream data (SOB) are distributed and recorded in the application packet areas of a plurality of stream PES packets (cf. ST10 in FIG. 12). When the start portion of the application packet area included in the first stream PES packet in the stream data (SOB) does not match the first byte of a time stamp (ATS) appended to the first application packet in the application packet area, information recording is done so that they match (cf. ST16 in FIG. 12).

In another recording method according to the present invention, the stream data (SOB) are distributed and recorded in the application packet areas of a plurality of stream PES packets (cf. ST10 in FIG. 12). When a blank portion is formed at the end of the application packet area, a stuffing area (cf. stuffing area in FIG. 5 (h) or padding area 37 in FIG. 19 (j)) formed of a predetermined number of bytes (without any time stamp) is provided or assured in the blank portion (cf. some of processes in ST22 of FIG. 12).

In still another recording method according to the present invention, as a result of distributing and recording the stream data (SOB) in the application packet areas of a plurality of stream packs (cf. ST10 in FIG. 12), when a blank portion for one stream pack or more (cf. area of sector No. n in FIG. 6 (e)) is formed between the end of the last stream pack that actually contains stream data, and the end of an area that records the stream data, stuffing packets (FIG. 6 (i) and (j)) that fill the blank portion are recorded (cf. ST20 in FIG. 12).

In still another recording method according to the present invention, the stream data (SOB) is formed by a plurality of data units (SOBU#α, ..., SOBU#λ in FIG. 8 (a)), and each data unit is formed by one or more data packets (TP/AP in FIG. 8 (b)) each of which records predetermined time stamp (TMS) information.

At least a time difference value (rounded value in FIGS. 8 (c) and (d)) corresponding to the difference between the first time stamp (TMS 1a) recorded in the first data unit (SOBU#α) and the second time stamp (TMS 33a) recorded in the second data unit (SOBU#β) of a plurality of the data units (SOBU#α, ..., SOBU#λ) is recorded in the management area (STREAM.IFO/SR_MANGR.IFO) (cf. some of processes in ST24 in FIG. 12).

In still another recording method according to the present invention, one or more pieces of cell information (cf. FIG. 18) are recorded in the stream data (SOB), and information (PGCI in FIG. 3 (f) or FIG. 13) of a program chain (PGC) that describes a set of one or more cells is recorded in the management area (STREAM.IFO/SR_MANGR.IFO).

Information (SC_EPI) of an entry point (EP), which can be used as a marker of a skip position upon partially skipping recorded contents of the stream data (SOB) in playback, is recorded in the management information (STRI) (cf. some of processes in ST24 in FIG. 12).

In order to achieve the other object, a data structure according to the present invention has a data area (STREAM.VRO/SR_TRANS.SRO) for recording stream data (SOB or SOBU) using predetermined data recording units (transport packets or application packets), and a management area (STREAM.IFO/SR_MANGR.IFO) for recording management information (STRI) that pertains to the stream data.

A plurality of stream packs each of which contains one or more data recording units (application packets) with time stamps (ATS) are used, and the stream data are distributed to a plurality of the stream packs. Each stream pack contains a pack header and a stream PES packet.

The start portion of an application packet area included in the first stream PES packet in the stream data (SOB) matches the start byte of the time stamp (ATS) appended to the first data recording unit (application packet) in the application packet area.

Note that the stream PES packet may include a stuffing byte of a variable length including zero byte length, and an application packet area including one or more data recording units (application packets) with time stamps (ATS).

In another data structure according to the present invention, when a blank portion is formed at the end of the application packet area, a stuffing area (stuffing area in FIG. 5 (h) or padding area 37 in FIG. 19 (j)) formed of (or consisting of) a predetermined number of bytes (without any time stamp) is provided or assured in the blank portion.

In still another data structure according to the present invention, when a blank for one stream pack or more is formed between the end of the last stream pack that actually contains stream data (SOB), and the end of an area that records the stream data (SOB), stuffing packets that fill the blank portion are recorded as padding data.

In still another data structure according to the present invention, the stream data (SOB) includes a plurality of data units (SOBU#α, ..., SOBU#λ in FIG. 8 (a)), and each of the data units (SOBU#α, ..., SOBU#λ) includes one or more data packets (TP/AP in FIG. 8 (b)) each of which records time stamp (TMS) information.

A time difference value (rounded value in FIGS. 8 (c) and (d)) corresponding to the difference between the first time stamp (TMS 1a) recorded in the first data unit (SOBU#α) and the second time stamp (TMS 33a) recorded in the second data unit (SOBU#λ) of a plurality of the data units (SOBU#α, ..., SOBU#λ) is recorded in the management area (STREAM.IFO/SR_MANGR.IFO).

In still another data structure according to the present invention, one or more pieces of cell information (cf. FIG. 18) are recorded in the stream data (SOB), and information (PGCI in FIG. 3 (f) or FIG. 13) of a program chain (PGC) that describes a set of one or more cells is recorded in the management area (STREAM.IFO/SR_MANGR.IFO).

The management information (STRI) stores information (SC_EPI) of an entry point (EP) which can be used as a marker of a skip position upon partially skipping recorded contents of the stream data (SOB) in playback.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 18 is a view for explaining the relationship between cells designated by an original or user-defined PGC and SOBUs corresponding to these cells via time map information.

DETAILED DESCRIPTION OF THE INVENTION

A recording method of stream data, its data structure, and so on, according to an embodiment of the present invention will be described hereinafter with reference to the accompanying drawings.

Figure 1:
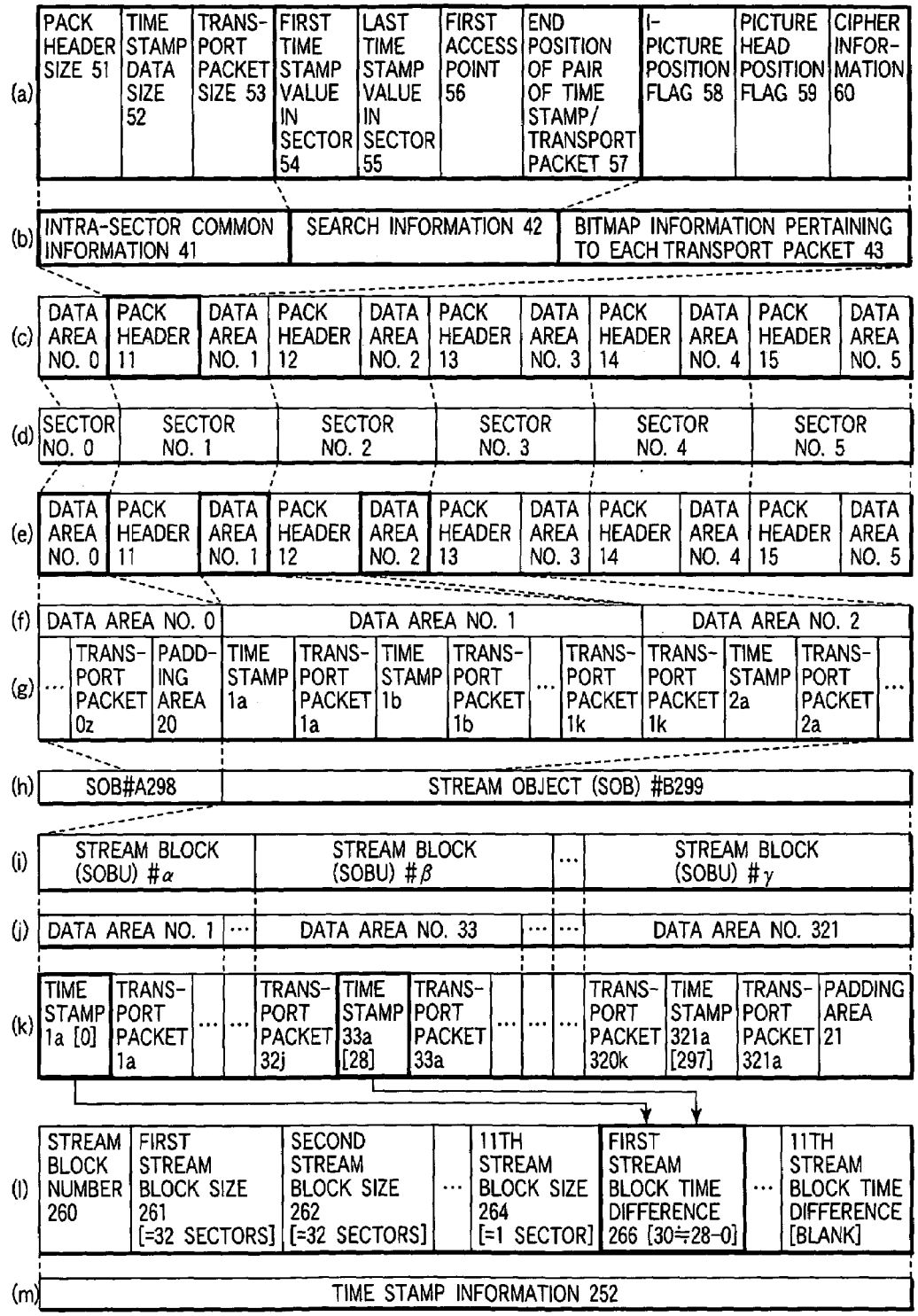
FIG. 1 is a view for explaining the data structure of stream data according to an embodiment of the present invention.

FIG. 1 is a view for explaining the data structure of stream data according to an embodiment of the present invention.

Stream data are recorded on an information storage medium to be combined as a stream object in correspondence with the contents of video information or single video recording contents in stream data.

FIG. 1 (h) exemplifies a stream object recorded on an information medium such as a DVD-RAM disc or the like. FIG. 1 (h) shows the last part of stream object #A 298 and stream object #B 299 recorded after that stream object.

When such stream data are recorded on the DVD-RAM disc or the like, the data are recorded using 2,048-byte sectors as minimum units, as shown in FIG. 1 (d). Each sector is divided into recording areas of pack headers (or packet headers) 11 to 15 and data areas for recording stream data, as shown in FIGS. 1 (c) and (e).

Each data area is packed in turn with time stamps and transport packets, as shown in FIGS. 1 (f) and (g). Such packing can be done as follows. That is:

1. Time stamps and transport packets are sequentially recorded together at a location other than pack headers 11 to 15 in a sector, and when the division (or cutting portion) of a time stamp or that of stream data recorded in units of transport packets is different from a sector boundary position, either the time stamp or transport packet is allocated and recorded to a position being across to the neighboring (or adjacent) sector.

More specifically, when time stamps and transport packets are packed in turn in data area No. 1 in FIG. 1 (g), a portion of transport packet 1k cannot be stored in and overflows from data area No. 1. The portion of this transport packet 1k, which overflows from data area No. 1 is successively recorded at the head position of data area No. 2 in the next sector No. 2.

2. A group of single video recording contents done by the user or the like or a group of identical contents such as a single program or the like is defined as a stream object. When the last transport packet position of the stream object recorded on the information storage medium is different from a sector boundary position, an area after that last transport packet position is set as a padding area as long as the corresponding sector has a remaining area.

More specifically, in the example shown in FIG. 1 (k), video recording comes to an end at transport packet 321a, which is a practical last position of stream object #B 299. In this case, when this transport packet 321a is allocated in the middle of data area No. 321 in FIG. 1 (j), the remaining area after packet 321a is set as padding area 21.

Using such data structure, a packet having a size larger than the sector size can be efficiently recorded.

FIG. 1 also shows the data structure that pertains to time map information. The contents of data in time map information 252 will be described below using FIG. 1.

As exemplified in FIGS. 1 (h) and (i), stream object (SOB) #B•299 consists of a plurality of stream blocks (SOBUS) #α to #γ.

In the example shown in FIGS. 1 (h) and (i), the data size of each of stream blocks (SOBUs) #α to #γ that form SOB#B•299 is equal to two ECC blocks, i.e., a size for 32 sectors. That is, each of first stream block sizes 261 to 264 (FIG. 1 (l)) in time map information (FIG. 1 (m)) is equal to 32 sectors (64 k bytes).

First stream block (SOBU) #α (FIG. 1 (i)) in SOB#B•299 (FIG. 1 (h)) has sector No. 1 (FIG. 1 (d)) at its head position, and time stamp 1a (FIGS. 1 (g) and (k)) is recorded at the head position of data area No. 1 (FIGS. 1 (e), (f), and (j)) included in sector No. 1.

Succeeding stream block (SOBU) #β (FIG. 1 (i)) of SOB#B•299 (FIG. 1 (h)) has data area No. 33 (FIG. 1 (j)), which records transport packet 33a (FIG. 1 (k)) with time stamp 33a.

As shown in FIG. 1 (k), the time stamp value [0] of the first stream data (transport packet 1a) of stream block (SOBU) #α is time stamp 1a, and the time stamp value [28] of stream data (transport packet 33a) in the next stream block (SOBU) #β is time stamp 33a.

The value [30] of first stream block time difference 266 in FIG. 1 (l) is given by rounding the difference value ([28]-[0]) between time stamps 33a and 1a to retain a predetermined effective number of digits (in this case, one effective digit) (by increasing the last retained digit by 1) ([28]-[0]≈[30]).

Note that time map information 252 in FIG. 1 (m) may be handled as the one including access data unit AUD in stream object information SOBI which will be described later with reference to FIG. 15. With information (access unit start map AUSM and the like) included in this AUD, an SOBU that includes information to be accessed (required I-picture information or the like) can be specified.

In the format shown in FIG. 1, the sector number of the first sector of stream object #B 299 is set at 1, and the sector number is incremented in turn. The sector number matches the data area number, and the time stamp number and transport packet number are set in correspondence with these numbers. That is, the first pair of time stamp and transport packet allocated in a data area in the 33rd sector are set to have the number "33*a*", and the numbers of the subsequent pairs in that data area are set to be "33*b*", "33*c*". Note that the number of the time stamp or transport packet such as transport packet 32*j* or 320*k* which overflows from the immediately preceding data area and is recorded to a position in the next data area is indicated in correspondence with the immediately preceding data area number. Also, the contents of brackets [ ] in FIG. 1 (*k*) exemplify the actual values of time stamps.

As shown in FIG. 1 (*a*) to (*c*), as intra-sector common information 41 in information in pack headers (or packet headers) 11 to 15, pack header size 51, time stamp size 52, and transport packet size 53 are described.

Taking sector No. 1 in FIG. 1 (*d*) as an example, first time stamp value 54 in a sector in search information 42 in FIG. 1 (*b*) means the value of time stamp 1*a* [=0] in FIG. 1 (*k*). On the other hand, last time stamp value 55 in a sector in search information 42 means the value of time stamp 1*k* (not shown).

Many dictionaries contain footnotes or the first and last words of individual pages at the header positions in these pages so as to facilitate a search. Likewise, the two pieces of information (first and last time stamp values 54 and 55 shown in FIG. 1 (*a*)) facilitate a search of stream data.

Since a single time stamp or transport packet can be allocated across neighboring sectors, when an independent access is made in units of sectors, the first time stamp position information is required. First access point 56 shown in FIG. 1 (*a*) means the number of bits counted from a position immediately after the packet header to the first time stamp position. However, this embodiment is not limited to such specific information. For example, the number of bits to the first transport packet head position may be provided as information (equivalent to first access point 56).

In this embodiment, since a value larger than the data area size can be designated as the value of first access point 56, the time stamp head position of a packet having a size larger than the sector size can be designated.

For example, a case will be examined below wherein in the data structure shown in FIG. 1 (*d*) to (*g*), a single packet is recorded across sectors No. 1 and No. 2, a time stamp for that packet is recorded at the first position in a data area of sector No. 1, and a time stamp for the next packet is allocated at the T-th bit position in a data area in sector No. 2.

In this case, the value of first access point 56 of sector No. 1 is "the data area size of sector No. 1+T), and the value of the first access point of sector No. 2 is "T".

Since a value larger than the data area size of sector No. 1 is set as the value of first access point 56 of sector No. 1, it indicates that the position of a time stamp corresponding to a packet that follows the packet recorded in sector No. 1 is present in the next sector or subsequent sector.

When partial erase (see FIG. 9) is done in units of sectors, last position information 57 (FIG. 1 (*a*)) of a substantially effective pair of time stamp and transport packet which do not run to a position in the next sector is required.

In this embodiment, the number of pairs of time stamps and transport packets which are recorded in a complete form (do not run to other sectors) is described. However, this embodiment is not limited to such specific information, and information of, e.g., the last position address may be recorded (as last position information 57).

As shown in FIGS. 1 (*a*) and (*b*), bitmap information 43 that pertains to each transport packet includes I-picture position flag 58, picture head position flag 59, and cipher information 60. I-picture position flag 58 and picture head position flag 59 in FIG. 1 (*a*) can be generated using information of random access indicator 303 and payload unit start indicator 301 which will be described later with reference to FIG. 5. Cipher information 60 records information used in copy protection as needed.

Based on intra-sector common information 41 and search information 42 in FIG. 1 (*b*), the number of transport packets in a sector of interest can be detected. One bit is assigned to each of these transport packets in the layout order, and a flag "1" can be set for a transport packet that clears the above condition. Bitmap information 43 which pertains to individual transport packets set with these flags is recorded in a pack header, as shown in FIGS. 1 (*b*) and (*c*).

Figure 5:
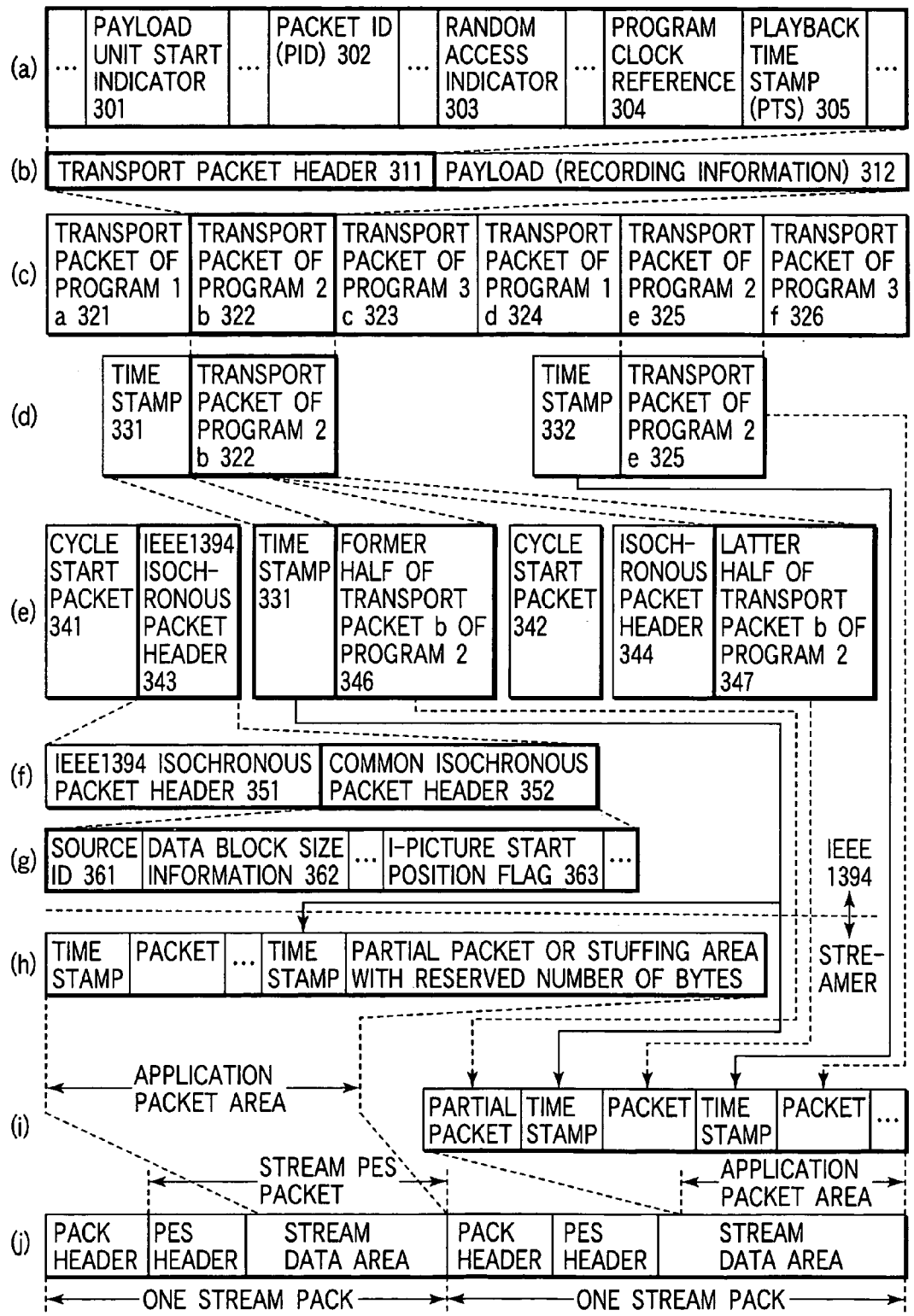
FIG. 5 is a view for explaining the relationship among the video data transfer formats in digital broadcast, IEEE1394, and a streamer.

In digital broadcast, video information compressed according to the MPEG2 format is transferred. Digital broadcast adopts a multi-program compatible multiplexing/demultiplexing scheme called a transport stream, as shown in FIG. 5 (*c*), and one transport packet b 322 often has a size of 188 bytes (or 183 bytes).

As described above, one sector size is 2,048 bytes, and each data area can record approximately 10 transport packets for digital broadcast even after various header sizes are subtracted. By contrast, in a digital communication network such as ISDN or the like, a long packet having a packet size as large as 4,096 bytes is often transferred.

Using the data structure in FIG. 1, one packet can be recorded across a plurality of data areas, so that a packet with a large packet size such as a long packet can be recorded. All packets, i.e., transport packets for digital broadcast, a long packet for digital communications, and the like can be recorded in a stream block (SOBU in FIG. 1 (*i*)) without any fractions independently of their packet sizes.

Figure 2:
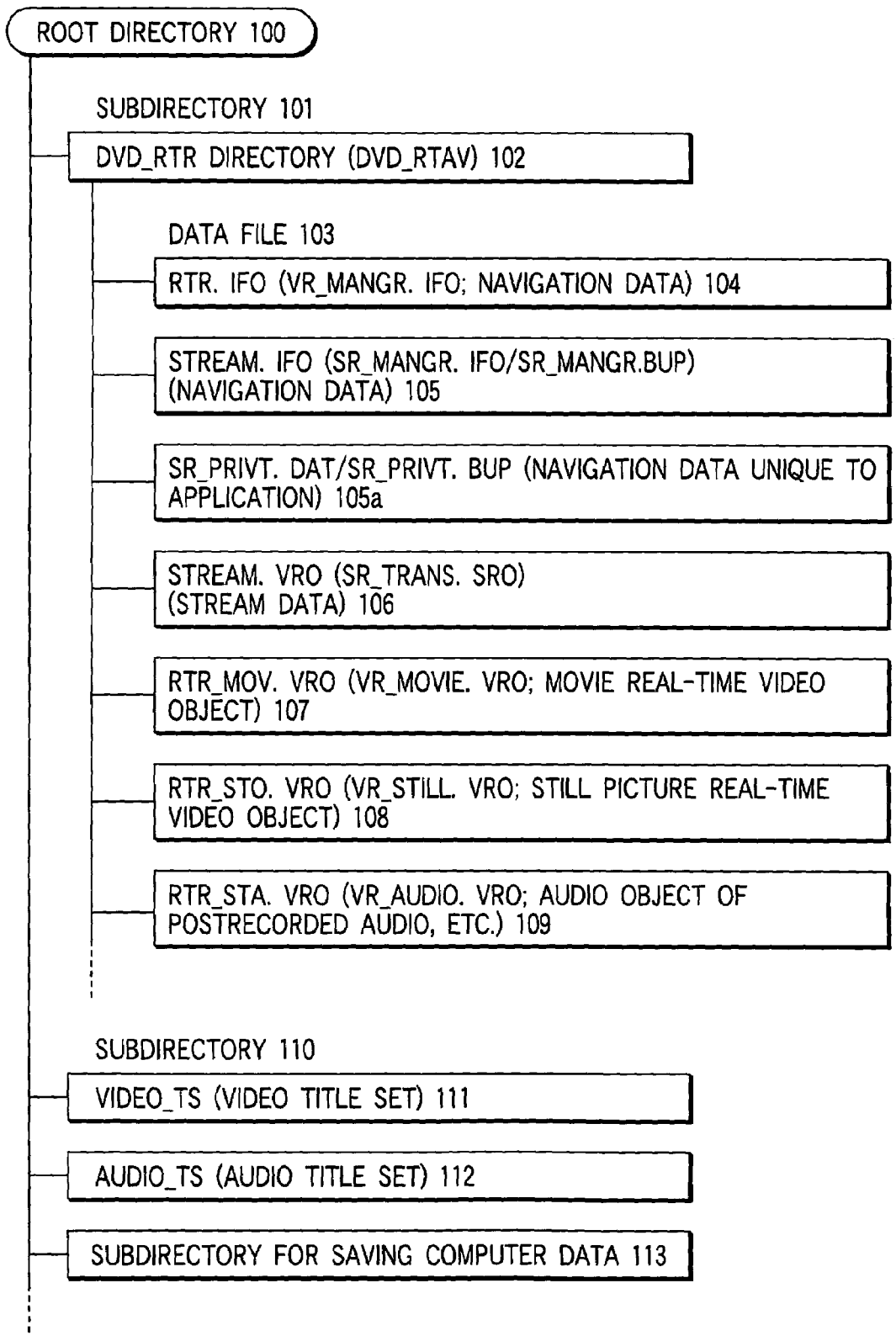
FIG. 2 is a view for explaining the directory structure of data files according to an embodiment of the present invention.

FIG. 2 is a view for explaining the directory structure of data files according to an embodiment of the present invention. The contents (file structure) of information recorded on the information storage medium according to an embodiment of the present invention will be explained below.

Each information recorded on an information storage medium such as a DVD-RAM disc or the like has a hierarchical file structure. Video information and stream data information to be explained in this embodiment are stored in subdirectory 101 named DVD_RTR directory (or DVD_RTAV) 102.

DVD_RTR (DVD_RTAV) directory 102 stores data file 103 having the following contents. More specifically, as a group of management information (navigation data), RTR.IFO (VR_MANGR.IFO) 104, STREAM.IFO (SR_MANGR.IFO/SR_MANGR.BUP) 105, and SR_PRIVT.DAT/SR_PRIVT.BUP 105*a* are stored.

As a data main body (contents information), STREAM.VRO (SR_TRANS.SRO) 106, RTR_MOV.VRO (VR_MOVIE.VRO) 107, RTR_STO.VRO (or VR_STILL.VRO) 108, and RTR_STA.VRO (or VR_AUDIO.VRO) 109 are stored.

Root directory 100 as an upper layer of subdirectory 101 including data file 103 can be provided with subdirectory 110 for storing other kinds of information. This subdirectory includes, as its contents, video title set VIDEO_TS 111 that stores video programs, audio title set AUDIO_TS 112 that stores audio programs, subdirectory 113 for saving computer data and the like.

Data which is transmitted on a wired or wireless data communication path in the form of a packet structure and is recorded on an information storage medium while holding the packet structure is called "stream data".

The stream data themselves are recorded together with file name STREAM.VRO (or SR_TRANS.SRO) 106. A file that records management information of the stream data is STREAM.IFO (or SR_MANGR.IFO and its backup file SR_MANGR.BUP) 105.

A file that records analog video information which is used in a VCR (VTR) or conventional TV and is digitally compressed based on MPEG2 is RTR_MOV.VRO (or VR_MOVIE.VRO) 107, a file that collects still picture information including postrecorded audio, background audio, or the like is RTR_STO.VRO (or VR_STILL.VRO) 108, and its postrecorded audio information file is RTR_STA.VRO (or VR_AUDIO.VRO) 109.

Figure 3:
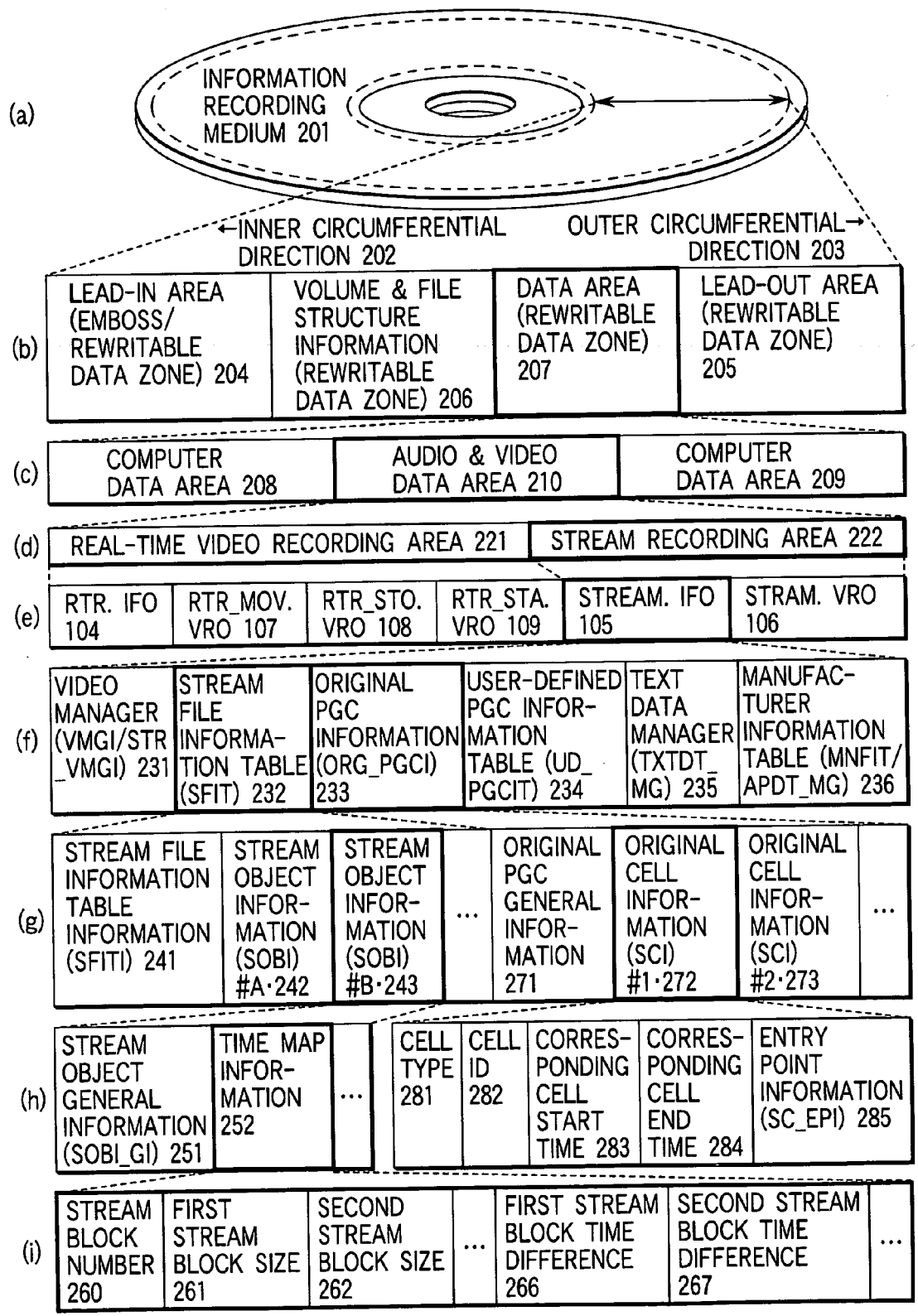
FIG. 3 is a view for explaining the recorded data structure (especially, the structure of management information) on an information medium (recordable/reproducible DVD disc) according to an embodiment of the present invention.

FIG. 3 is a view for explaining the recorded data structure (especially, the structure of management information) on an information medium (recordable/reproducible DVD disc) according to an embodiment of the present invention.

In an area sandwiched between the ends of inner circumferential direction 202 and outer circumferential direction 203 of information storage medium 201 shown in FIG. 3 (a), lead-in area 204, volume & file structure information 206 that records file system information, data area 207, and lead-out area 205 are present, as shown in FIG. 3 (b). Lead-in area 204 is made up of an emboss zone and rewritable data zone, and lead-out area 205 is made up of a rewritable data zone. Data area 207 is also made up of a rewritable data zone.

Data area 207 can record computer data and audio & video data together, as shown in FIG. 3 (c). In this example, audio & video data area 210 is sandwiched between computer data areas 208 and 209.

Audio & video data area 210 can record real-time video recording area 221 and stream recording area 222 together, as shown in FIG. 3 (d). (Either of real-time video recording area 221 or stream recording area 222 can be used.)

As shown in FIG. 3 (e), real-time video recording area 221 records RTR navigation data RTR.IFO (VR_MANGR.IFO) 104, movie real-time video object RTR_MOV.VRO (VR_MOVIE.VRO) 107, still picture real-time video object RTR_STO.VRO (VR_STILL.VRO) 108, and audio object RTR_STA.VRO (VR_AUDIO.VRO) 109 such as postrecorded audio or the like, which are shown in FIG. 2.

Also, as shown in FIG. 3 (e), stream recording area 222 records streamer navigation data STREAM.IFO (SR_MANGR.IFO/SR_MANGR.BUP) 105 and transport bitstream data STREAM.VRO (SR_TRANS.SRO) 106, which are shown in FIG. 2.

Note that stream recording area 222 can also record navigation data SR_PRIVT.DAT/SR_PRIVT.BUP 105a unique to an application shown in FIG. 2, although not shown in FIGS. 3 (d) and (e).

This SR_PRIVT.DAT 105a is navigation data unique to an individual application connected (supplied) to the streamer, and need not be recognized by the streamer.

STREAM.IFO (or SR_MANGR.IFO) 105 as management information that pertains to stream data has a data structure shown in FIG. 3 (f) to (i).

More specifically, as shown in FIG. 3 (f), STREAM.IFO (or SR_MANGR.IFO) 105 is comprised of video manager (VMGI or STR_VMGI) 231, stream file information table (SFIT) 232, original PGC information (ORG_PGCI) 233, user-defined PGC information table (UD_PGCIT) 234, text data manager (TXTDT_MG) 235, and manufacturer information table (MNFIT) or application private data manager (APDT_MG) 236 that manages navigation data SR_PRIVT.DAT 105a unique to an application.

Stream file information table (SFIT) 232 shown in FIG. 3 (f) can contain stream file information table information (SFITI) 241, one or more pieces of stream object information (SOBI) #A•242, #B•243, . . . , original PGC information general information 271, and one or more pieces of original cell information #1•272, #2•273, . . . , as shown in FIG. 3 (g).

Each stream object information (e.g., SOBI#B•243) shown in FIG. 3 (g) can contain stream object general information (SOBI_GI) 251, time map information 252, etc., as shown in FIG. 3 (h).

Each original cell information (e.g., #1•272; corresponding to SCI shown in FIG. 14 to be described later) shown in FIG. 3 (g) can contain cell type 281 (corresponding to C_TY shown in FIG. 14 to be described later), cell ID 282, corresponding cell start time (corresponding to SC_S_APAT shown in FIGS. 9 (k) and (l) and FIG. 14 to be described later) 283, corresponding cell end time (corresponding to SC_E_APAT shown in FIGS. 9 (k) and (l) and FIG. 14 to be described later) 284, entry point information (SC_EPI) 285, as shown in FIG. 3 (h).

Entry point information (SC_EPI) 285 can be used as a tool for partially skipping recorded contents. This entry point information (SC_EPI) 285 includes two types (types A and B) depending on the presence/absence of primary text information (PRM_TXTI), as shown in FIG. 14.

Note that an entry point indicates an entry position into a program in case of an original PGC or an entry position into a portion of a program in case of a user-defined PGC. Such entry points are recorded as a part of cell information (SCI). These entry points can be used to skip a portion of recorded contents upon playing back the recorded contents.

All entry points can be specified by application packet arrival times (APAT). This application packet arrival time of the entry point is indicated by EP_APAT in FIG. 14.

Time map information 252 in FIG. 3 (h), which is contained in SOBI#A in FIG. 3 (g) can include stream block number 260, first stream block size 261, second stream block size 262, . . . , and first stream block time difference 266, second stream block time difference 267, . . . , as shown in FIG. 3 (i).

An example of stream block time difference 266 that forms time map information 252 is shown in FIG. 1 (l). The contents of each stream block time difference that forms time map information 252 will be explained later with reference to FIG. 8.

Figure 4:
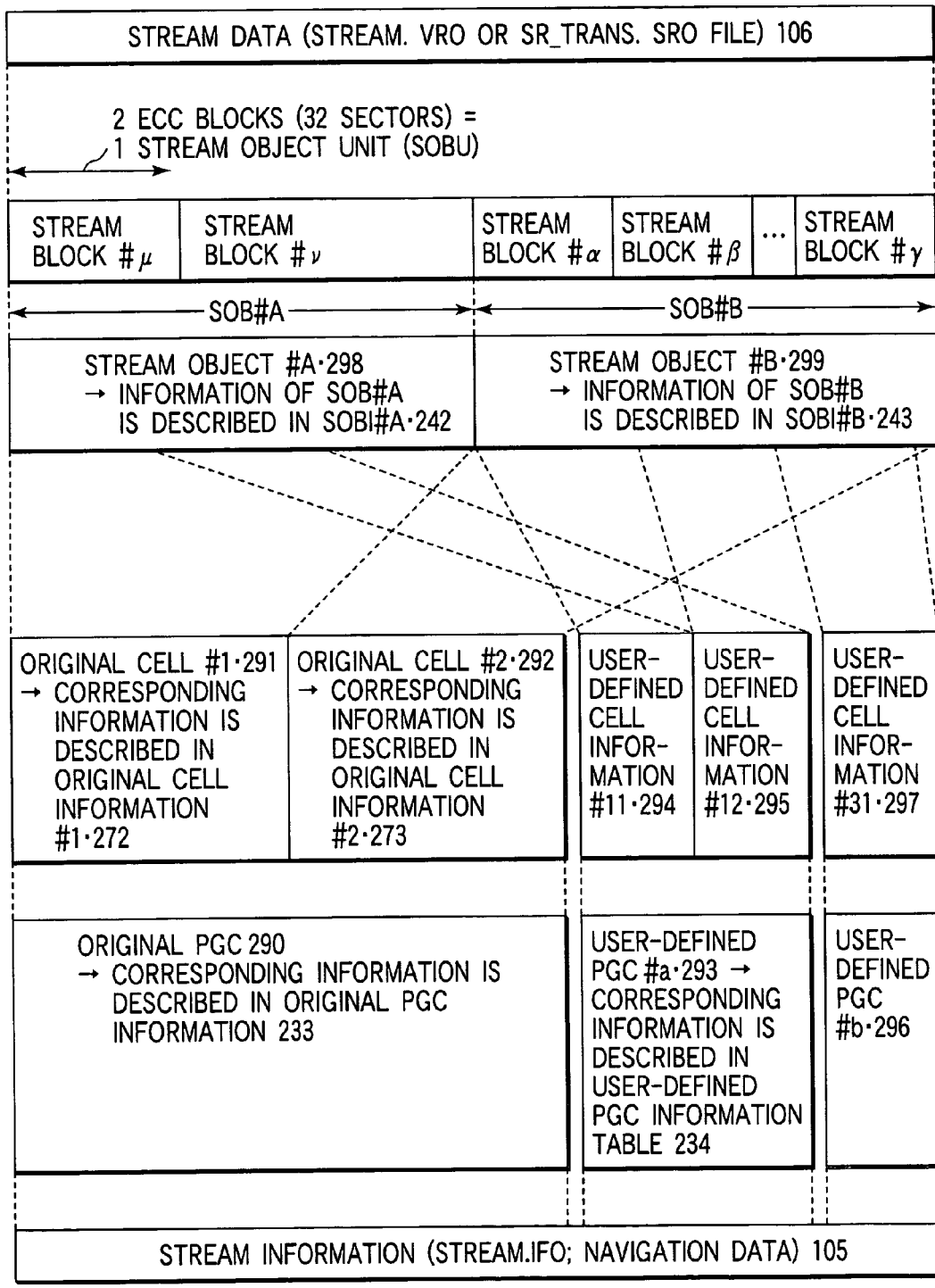
FIG. 4 is a view for explaining the relationship among stream objects (SOB), cells, program chains (PGC), and the like in the present invention.

FIG. 4 is a view for explaining the relationship among stream objects (SOB), cells, program chains (PGC), etc., in an embodiment of the present invention. The relationship between SOB and PGC in the present invention will be explained below using an example shown in FIG. 4.

Stream data recorded in stream data (STREAM.VRO or SR_TRANS.SRO) 106 form stream blocks as sets of one or more ECC blocks, and recording, a partial erase process, and the like are done in units of stream blocks. The stream data form groups called stream objects in units of contents of information to be recorded (e.g., in units of programs in digital broadcast).

Management information (original PGC information 233, user-defined PGC information table 234, or the like) for each stream object (SOB#A, SOB#B) recorded in STREAM.VRO (SR_TRANS.SRO) 106 is recorded in navigation data STREAM.IFO (SR_MANGR.IFO) 105 (see lowermost portion in FIG. 4 and FIGS. 3 (*e*) and (*f*)).

Two pieces of management information (STREAM.IFO 105) for stream objects #A•298 and #B•299 in FIG. 4 are recorded as two pieces of stream object information (SOBI) #A•242 and #B243 in stream file information table (SFIT) 232, as shown in FIGS. 3 (*f*) and (*g*).

Each of stream object information (SOBI) #A•242 and #B243 contains time map information 252 that mainly describes the data size, time information, and the like in units of stream blocks.

Upon playing back stream data, information (corresponding to PGCI#i in FIG. 14 to be described later) of a program chain (PGC) made up of one or more successive cells is used. Stream data can be played back in accordance with the order in which the cells that form this PGC are set.

There are two types of PGCs, i.e., original PGC 290 (ORG_PGCI•233 in FIG. 3 (*f*)) which can continuously play back all stream data recorded in STREAM.VRO (SR_TRANS.SRO) 106, and user-defined PGCs #a•293 and #b•296 (corresponding to the contents of UD_PGCIT•234 in FIG. 3 (*f*)) that can set arbitrary locations and order of user choice.

Original cells #1•291 and #2•292 that form original PGC 290 basically have one-to-one correspondence with stream objects #A•298 and #B•299.

By contrast, user-defined cells #11•294, #12•295, and #31•297 that form the user-defined PGC can set arbitrary locations within the range of one stream object #A•298 or #B•299.

A cell range can be designated by designating its start and end times. More specifically, in the example shown in FIG. 1 (*k*), the values of first time stamp 1*a* and last time stamp 321*a* in corresponding stream object #B•299 are used as the values of corresponding cell start and end times 283 and 284 (FIG. 3 (*h*)) in original cell #2•292 before execution of partial erase or edit (immediately after recording of stream data).

By contrast, the time range in user-defined cell #11•294 in FIG. 4 can designate arbitrary times, and the values of time stamps corresponding to designated transport packets can be set as the values of corresponding cell start and end times.

As a method of accessing stream data in the stream object, playback of which is to begin, this embodiment can use two methods:

(1) a method of accessing data using the total recorded data size from the recording start position of each stream object; and (2) a method of accessing data taking the decode timing of a decoder into consideration in correspondence with video compression by MPEG.

As can be seen from FIG. 1 (*g*), all transport packets are additionally recorded with time stamp information, and each transport packet can be accessed using this time stamp information.

When a DVD-RAM disc is used as an information storage medium, ECC blocks are formed every 16 sectors. In an embodiment of the present invention, stream data are grouped in units of integer multiples (e.g., twice) of ECC blocks, and an elapsed time table is provided to each group, thus allowing the method (1) of "accessing data using the total recorded data size". The method (2) of "accessing data taking the decode timing of the decoder into consideration" will be explained in detail later in the description of FIG. 11.

In an embodiment of the present invention, time map information 252 is recorded as elapsed time tables in units of groups. This time map information is recorded in a portion of stream object information #A•242; #B•243 corresponding to each stream object, as shown in FIGS. 3 (*g*) and (*h*).

In an embodiment of the present invention, each group (sectors grouped in units of two ECC blocks) is called a stream block (or a data unit called an SOBU) (see upper portion in FIG. 4 or FIG. 1 (*i*)).

A time stamp is often not allocated at the start position of a sector which is allocated at the head position of each stream block (SOBU). In such case, it is difficult to define elapsed times in units of stream blocks (SOBUs).

Following measures can be taken against such situation.

A) A time stamp value allocated at a specific position of each stream block is used as a time unique to that stream block.

More specifically, the value of a time stamp which is allocated first in each stream block (and its recording did not start from the previous sector) is used as the start time of each stream block.

B) The differential time between unique times (each start times) in units of stream blocks is defined as an elapsed time of each stream block.

C) The elapsed time (differential time) information is recorded in time map information 252.

Using the differential time (elapsed time), the data size can be reduced. However, an embodiment of the present invention is not limited to such specific information, and each stream block unique time may be recorded in time map information 252.

D) The rounded value of the elapsed time (differential time) information is recorded in time map information 252.

By rounding the computation result of the elapsed time (differential time) information (by counting fractions as one or rounding off), the rounded value is recorded in time map information 252, thus reducing the data size.

E) The stream block boundary position set upon initial recording remains unchanged even in stream data after partial erase.

Note that the sector size of each stream block can be variously set. As a preferred embodiment, a stream object unit (SOBU) made up of two ECC blocks (32 sectors) and having a constant size (64 k bytes) can be used as a stream block like stream block #µ in FIG. 4.

When the stream block is fixed to be an SOBU having a constant size (e.g., 2 ECC blocks=32 sectors 64 k bytes), the following merits are obtained.

(01) Even when stream data is erased or rewritten in units of SOBUs, an ECC block of that SOBU does not influence ECC blocks of SOBUs other than the SOBU to be erased or rewritten. For this reason, ECC deinterleave/interleave upon erase or rewrite (for SOBUs other than the SOBU to be erased or rewritten) need not be done; and

(02) An access position to recorded information in an arbitrary SOBU can be specified by the number of sectors (or a parameter corresponding to the number of sectors; e.g., information of stream packs or application packets therein). For example, when the middle position of given SOBU#k is to be accessed, the 16th sector position (or application packet position corresponding to the 16th sector position) from the boundary between SOBU#k−1 and SOBU#k can be designated.

FIG. 5 is a view for explaining the correspondence among the digital broadcast contents, the video data transfer format in IEEE1394, and stream packs in the streamer.

In digital broadcast, video information compressed according to MPEG2 is transferred in transport packets. Digital broadcast adopts a multi-program compatible multiplexing/demultiplexing scheme called a transport stream, as shown in FIG. 5 (*c*), and one transport packet b 322 often has a size of 188 bytes (or 183 bytes).

Each transport packet is made up of transport packet header 311, and payload 312 that records a data main body of recording information, as shown in FIG. 5 (*b*).

Transport packet header 311 is comprised of payload unit start indicator 301, packet ID (PID) 302, random access indicator 303, program clock reference 304, playback time stamp (PTS) 305, and the like, as shown in FIG. 5 (*a*).

The MPEG-compressed video information contains I-, B-, and P-picture information. In the first transport packet that records I-picture information, random access indicator 303 in FIG. 5 (*a*) is set with flag="1". On the other hand, in the first transport packets of B-picture information and P-picture information, payload unit start indicator 301 in FIG. 5 (*a*) is set with flag="1".

Using information of these random access indicator 303 and payload unit start indicator 301, information of an I-picture mapping table and information of a B/P-picture start position mapping table are generated.

For example, a bit at the corresponding position in the B/P-picture start position mapping table is set at "1" for a transport packet having payload unit start indicator 301 shown in FIG. 5 (*a*) set with flag="1".

In digital broadcast, video information and audio information are transferred in different transport packets. The video information and audio information are distinguished by packet ID (PID) 302 in FIG. 5 (*a*). Using information of this PID 302, a video packet mapping table and an audio packet mapping table can be generated.

As shown in FIG. 5 (*c*), a plurality of programs (programs 1 to 3 in this example) are time-divisionally transferred while being packetized in a single transponder. For example, information of transport packet header 311 and that of payload (recording information) 312 in FIG. 5 (*b*) are transferred by transport packets b 522 and e 525 of program 2 shown in FIG. 5 (*c*).

In IEEE1394, as shown in FIGS. 5 (*e*) and (*f*), each of IEEE isochronous headers 343 and 344 includes isochronous packet header 351 and common isochronous packet header 352. In this common isochronous packet header 352, a format-dependent reserve area is set.

In an embodiment of the present invention, as shown in FIG. 5 (*g*), the format-dependent reserve area in common isochronous packet header 352 stores source ID 361, data block size information 362, and I-picture start position flag 363. Since I-picture start position flag 363 is set in the format-dependent reserve area in this manner, the I-picture position in stream data can also be designated in real time (i.e., a transport packet corresponding to the start position of I-picture can be designated) simultaneously with transfer of stream data in the isochronous mode. This is a great feature of this embodiment.

Note that the end portion of an application packet area in FIG. 5 (*h*) may often become blank in place of recording former half 346 of transport packet b of program 2. In this case, the end portion of the application packet area becomes a stuffing area (having no time stamp at its head position) having the reserved number of bytes.

A normal packet is appended with a time stamp. However, as shown in FIG. 5 (*i*), a time stamp can be omitted in a partial packet.

In this manner, partial packets (the partial packet size falls within the range from 1 to 187 bytes if the packet size is 188 bytes; an average of less than 100 bytes) divided at the boundary of two neighboring stream packs (FIG. 5 (*j*)) can be effectively used in information recording. In addition, the storage capacity of medium 201 can be increased by an amount of each time stamp (e.g., 4 bytes per time stamp) omitted from a partial packet.

Figure 10:
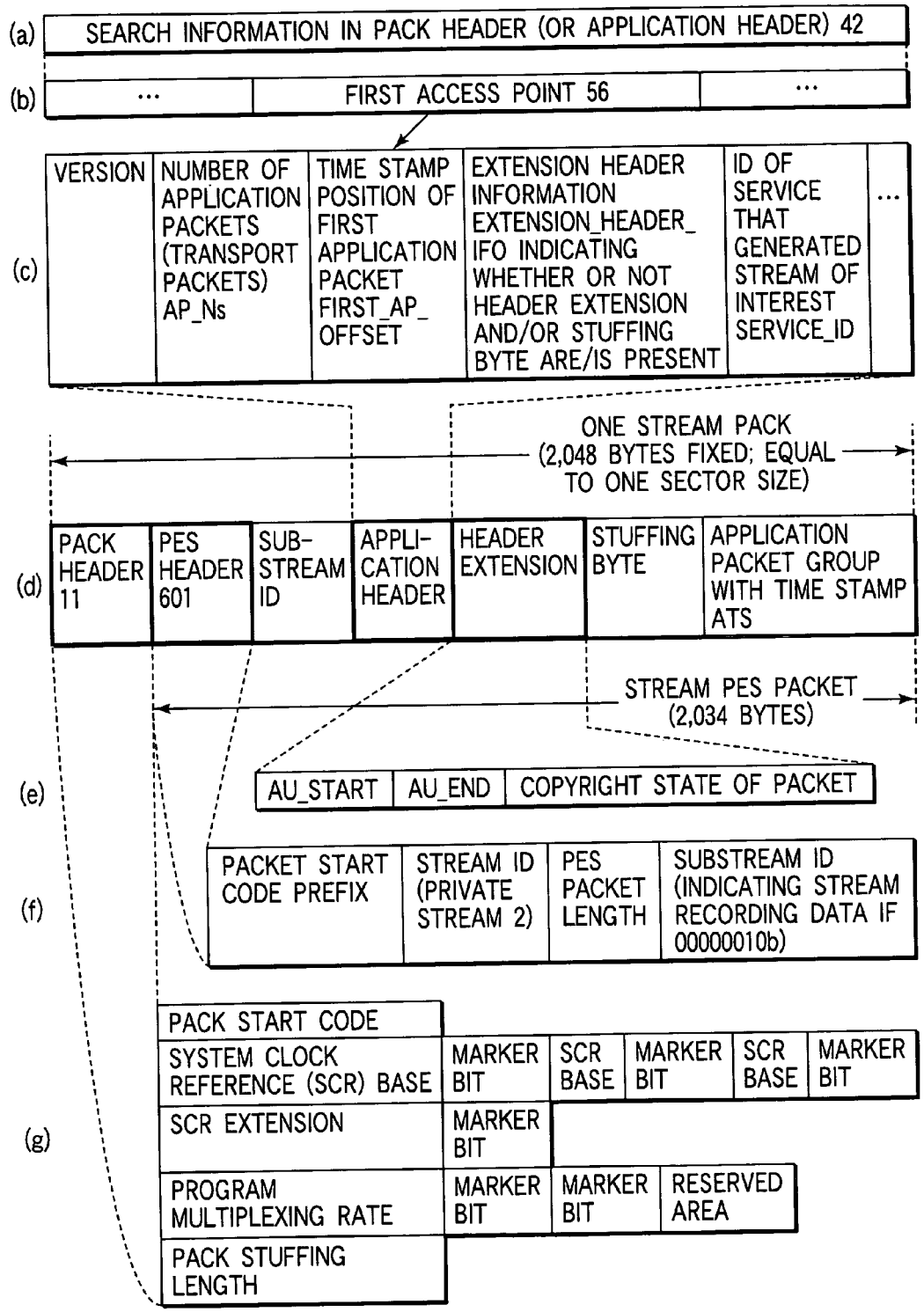
FIG. 10 is a view for explaining the data structure of a stream pack shown in FIG. 5, etc.

Note that the position of a time stamp located immediately after the first packet in FIG. 5 (*i*) can be specified by first access point 56 in FIG. 1 (*a*), or FIRST_AP_OFFSET shown in FIG. 10 (*c*).

Figure 6:
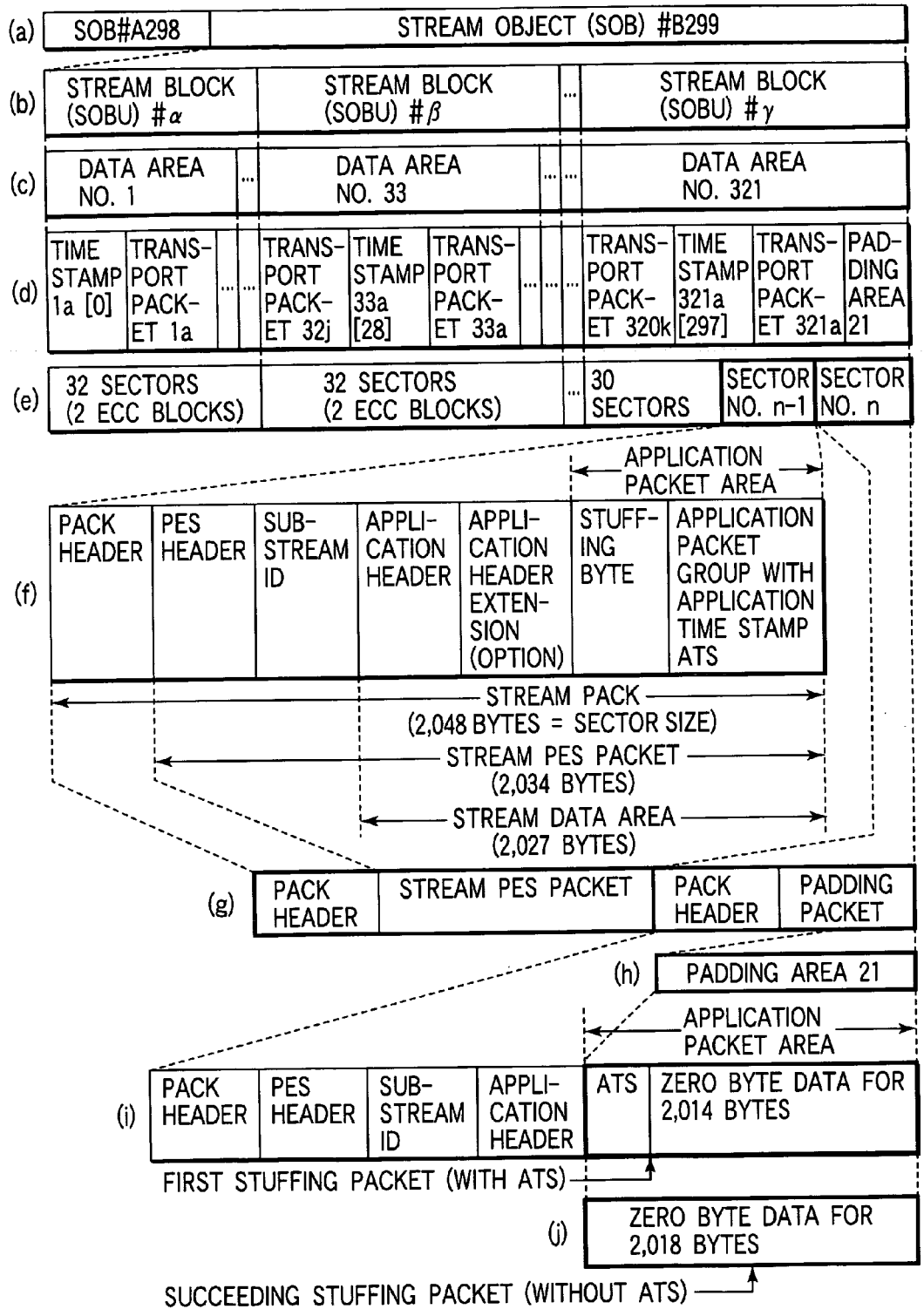
FIG. 6 is a view for explaining the sector structure that stores data of a stream object.

FIG. 6 is a view for explaining the sector a structure that stores data of a stream object.

FIG. 6 (*a*) to (*d*) show contents corresponding to FIG. 1 (*h*) to (*k*). In the example shown in FIG. 6, all stream blocks (SOBUS) #α to #γ have a fixed size (32 sectors/2 ECC blocks=64 k bytes). FIG. 6 (*f*) to (*j*) show the pack structure that form last sector No. n of stream block (SOBU) #γ and its immediately preceding sector No. n−1 (FIG. 6 (*e*)).

Each sector of stream block (SOBU) #γ has a similar data structure except for last sector No. n. For example, sector No. n−1 has a data structure, as shown in FIG. 6 (*f*).

More specifically, sector No. n−1 is made up of a stream pack of 2,048 bytes (2 k bytes). This stream pack is comprised of a 14-byte pack header and 2,034-byte stream PES packet.

The stream PES packet is comprised of a 6-byte PES header, 1-byte substream ID, and 2,027-byte stream data area.

The stream data area consists of a 9-byte application header, application header extension (option), stuffing byte (option), and application packet area.

The application packet area in FIG. 6 (*f*) can have the same structure as that shown in FIGS. 5 (*h*) and (*i*) (change "packet" in FIG. 5 (*h*) to read "application packet in FIG. 6).

The application packet area is made up of a group of application packets each having an application time stamp (ATS) at its head position (except for a stuffing area in FIGS. 5 (*h*) and a partial packet in FIG. 5 (*i*)). For example, when a transport packet having a 188-byte size is stored as an application packet in the application packet area, approximately 10 application packets can be stored in the application packet area.

In stream recording, an application that generates recording contents makes stuffing by itself to obviate the need for independent adjustment of the pack length. For this reason, in stream recording a stream pack can always have a required length (e.g., 2,048 bytes). The stuffing byte in FIG. 6 (*f*) is used to maintain the predetermined length (2,048 bytes) of a stream pack.

Last sector No. n of stream block (SOBU) #γ has a data structure shown in FIGS. 6 (*g*) to (*j*). That is, as shown in FIG. 6 (*g*), last sector No. n consists of a pack header and padding packet. This padding packet includes padding area 21 (corresponding to padding area 21 in FIG. 1 (*k*)) in its application packet area, as shown in FIG. 6 (*h*).

The first application packet area in padding area 21 is stuffed with a stuffing packet (zero-byte data having essentially no recording contents) with an application time stamp (ATS), as shown in FIG. 6 (*i*). If padding area 21 has a length for a plurality of sectors, the second or subsequent application packet area (subsequent stuffing packet) is stuffed with a stuffing packet (zero-byte data) without any ATS, as shown in FIG. 6 (*j*).

When recording is done at very low bit rate, the stuffing byte is required to ensure recovery (playback) of time map information (252 in FIG. 3 (*h*); or MAPL in SOBI in FIG. 15 to be described later). The stuffing packet in FIG. 6 (*i*) or FIG. 6 (*j*) is defined as a conceptual unit for that purpose.

The objective of this stuffing packet is achieved when each SOBU includes at least one ATS value as well as the stuffing area.

The following conditions are imposed on the stuffing packet:

One or a plurality of stuffing packets always start from the application packet area of a pack after a pack including actual application packet data; and One or a plurality of stuffing packets consist of one 4-byte ATS, and zero byte data (following ATS) required to stuff the application data area of the remaining pack of the SOBU of interest. Assuming that SOBU_SIZ represents the number of sectors per SOBU, if 0≦n≦SOBU_SIZ−1, the total length of the stuffing packet is "4+2,014+n×2,018" bytes.

ATS of the stuffing packet is set as follows:

In an SOBU in which at least one pack includes actual application packet data, ATS of the stuffing packet is set to be that of an application packet preceding the stuffing packet; and In an SOBU that does not include any actual application packet, ATS of the stuffing packet is determined in accordance with the contents of time map information or the like.

All packs each of which includes the stuffing packet or a portion of the stuffing packet are configured as follows:

SCR of the pack header is set to be the sum of SCR of the preceding pack and "2,048×8 bits+10.08 Mbps";

The PES packet header and substream ID are the same as those of all other PES packets; and In the application header (see FIGS. 10 (*c*) and (*d*)), AP_Ns=0, FIRST_AP_OFFSET=0, EXTENSION_HEADER_IFO=00b, and SERVICE_ID=0 (other parameters in the application header are set at zero).

Figure 7:
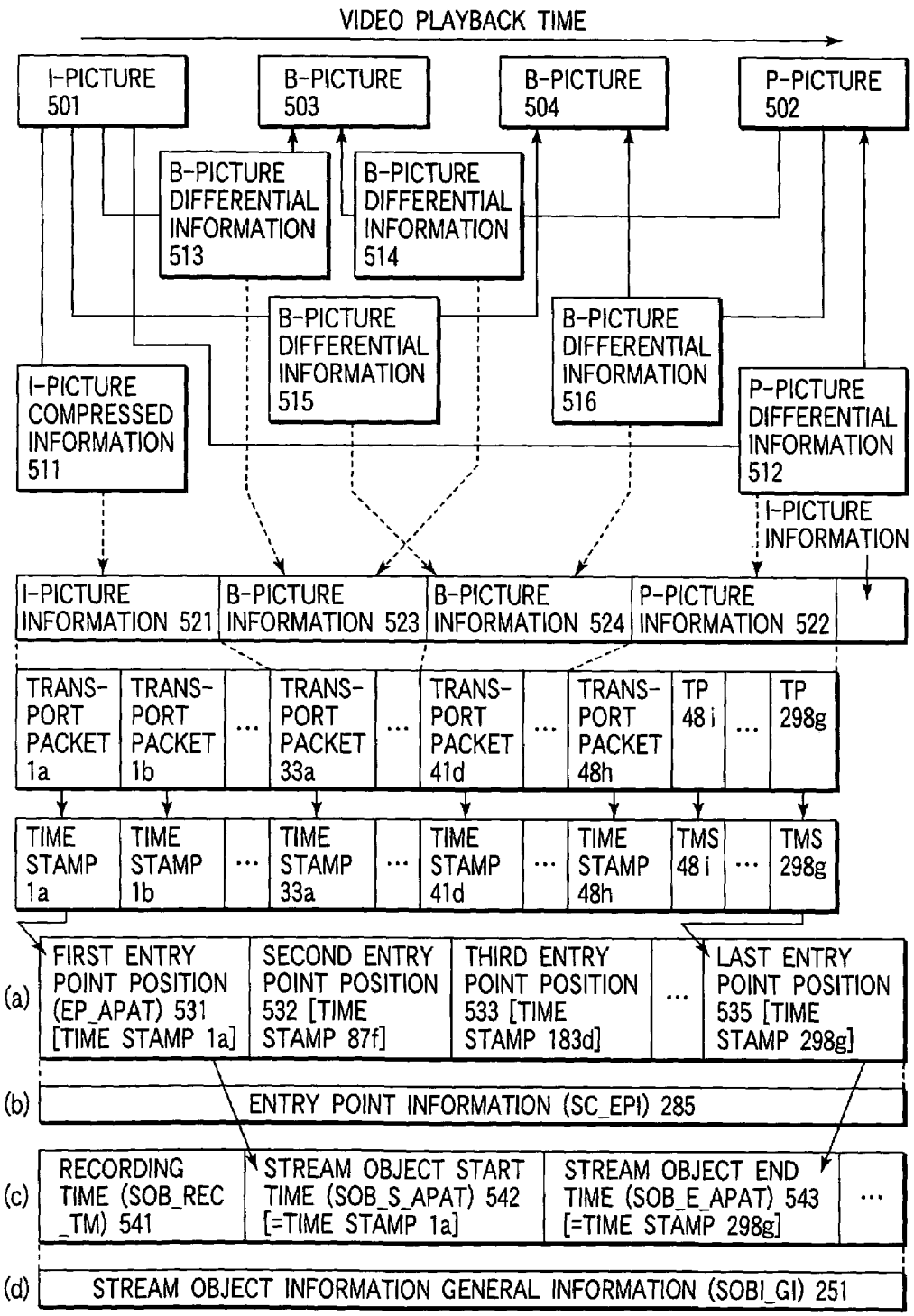
FIG. 7 is a view for explaining the relationship between the video information compression method in MPEG and transport packets.

FIG. 7 is a view for explaining the relationship between the video information compression method in MPEG and transport packets, and the relationship between transport packets in MPEG and application packets in the streamer.

As shown in FIG. 7, broadcast signal information in digital TV adopts a signal compression method called MPEG2. In the signal compression method based on MPEG, images (pictures) for TV display are categorized into I-picture 501 that does not contain any time differential information, and B-pictures 503 and 504 and P-picture 502 which contain time differential information.

I-picture independently exists without being influenced by the previous or next image (picture) information, and after DCT transformation for a single image (picture), quantized information becomes I-picture compressed information 511 and is recorded as I-picture information 521. As for P-picture 502, only differential information 512 from I-picture 501 is recorded as P-picture information 522. As for B-picture 503, two pieces of differential information 513 and 514 from I-picture 501 and P-picture 502 are recorded as B-picture information 523, and as for B-picture 504, two pieces of differential information 515 and 516 from I-picture 501 and P-picture 502 are recorded as B-picture information 524.

As shown in FIG. 7, compressed information 511 of I-picture 501 is recorded in transport packets 1*a*, 1*b*, . . . as I-picture information 521, two pieces of differential information 513 and 514 of B-picture are recorded in transport packets 33*a*, . . . as B-picture information 523, two pieces of differential information 515 and 516 of B-picture are recorded in transport packets 41*d*, . . . as B-picture information 524, and P-picture differential information 512 is recorded in transport packets (TP) 48*h* to 298*h* as P-picture information 522. In this way, I-, B-, and P-picture information are recorded in different transport packets.

Upon video playback, P-picture 502 or B-pictures 503 and 504 cannot solely generate images, but can generate picture images only after the image of I-picture 501 is generated. Pieces of picture information 521 to 524 are divisionally recorded in the payloads of one or a plurality of transport packets. At this time, the information is recorded so that the boundary position of each of picture information 521 to 524 always matches that between neighboring transport packets, as shown in FIG. 7.

In first transport packet 1*a* that records I-picture information 521, random access indicator 303 (FIG. 5 (*a*)) is set with flag="1". On the other hand, in first transport packets 33*a*, 41*a*, and 48*h* of pieces of B-picture information 523 and 524 and P-picture information 522, payload unit start indicator 301 (FIG. 5 (*a*)) is set with flag="1". Using information of random access indicator 303 and payload unit start indicator 301, I-picture position flag 58 and picture head position flag 59 in FIG. 1 (*a*) are generated. Likewise, pieces of information such as cipher information 60 used in copy protection and the like are recorded as bitmap information 43 (FIG. 5 (*b*)) that pertains to individual transport packets.

Position information (I-picture position information) of I-picture (501) in FIG. 7 is recorded as entry point information (SC_EPI) 285 in original cell information (SCI) (#1•272 or the like), as shown in FIGS. 3 (*g*) and (*h*).

The data structure in entry point information 285 has a list format of information of entry point positions (first entry point position (EP_APAT) 531, second entry point position 532, third entry point position 533, . . . , last entry point position 535) indicating individual I-picture position information present in a single stream object, as shown in FIGS. 7 (*a*) and (*b*).

As the information contents of entry point position (EP_APAT) 531, the value of time stamp 1*a* corresponding to transport packet 1*a* that records the first information of I-picture information 521 is recorded, as shown in FIG. 7 (*a*). As the information contents of individual entry point positions (EP_APAT) 532, 533, and 535 as well, the values of time stamps 87*f*, 183*d*, and 298*g* corresponding to transport packets that record the first information of the corresponding I-picture information are similarly recorded.

The corresponding cell start time information and/or the corresponding cell end time information for user-defined cell #11•294 shown in FIG. 4 are/is recorded in user-defined PGC information table 234 in FIG. 3 (*f*). In this case, when the user wants to play back from B-picture information 524 in FIG. 7, he or she can set time stamp 41*d* as the corresponding cell start time. In this manner, the corresponding cell start or end time information can be set using arbitrary time stamp information irrespective of the I-picture position.

On the other hand, the start/end time of a stream object in this embodiment is set in consideration of the I-picture position. That is, as the information contents of stream object general information 251 shown in FIGS. 3 (*h*) and (*d*), recording time (SOB_REC_™) 541 indicating the recording start time, stream object start time (SOB_S_APAT) 542, and stream object end time (SOB_E_APAT) 543 are recorded, as shown in FIG. 7 (*c*).

This stream object start time (SOB_S_APAT) 542 must be set with the value of time stamp 1*a* corresponding to transport packet 1*a* that records first I-picture information 521. Likewise, stream object end time (SOB_E_APAT) 543 must be set with the value of time stamp 298*g* corresponding to transport packet 298*g* immediately before I-picture information.

When transport packets in FIG. 7 are recorded by the streamer (optical disc device 415 in FIG. 11 to be described later), the contents of transport packets are transplanted to packets (application packets) with time stamps called application time stamps (ATS).

A group of application packets with ATS (normally, around 10 packets) are stored in an application packet area in a stream PES packet.

One stream pack is formed by appending a pack header to this stream PES packet. The stream PES packet is made up of a PES header, substream ID, application header, application header extension (option), stuffing bytes (option), and application packet area for storing the group of application packets with ATS.

Figure 8:
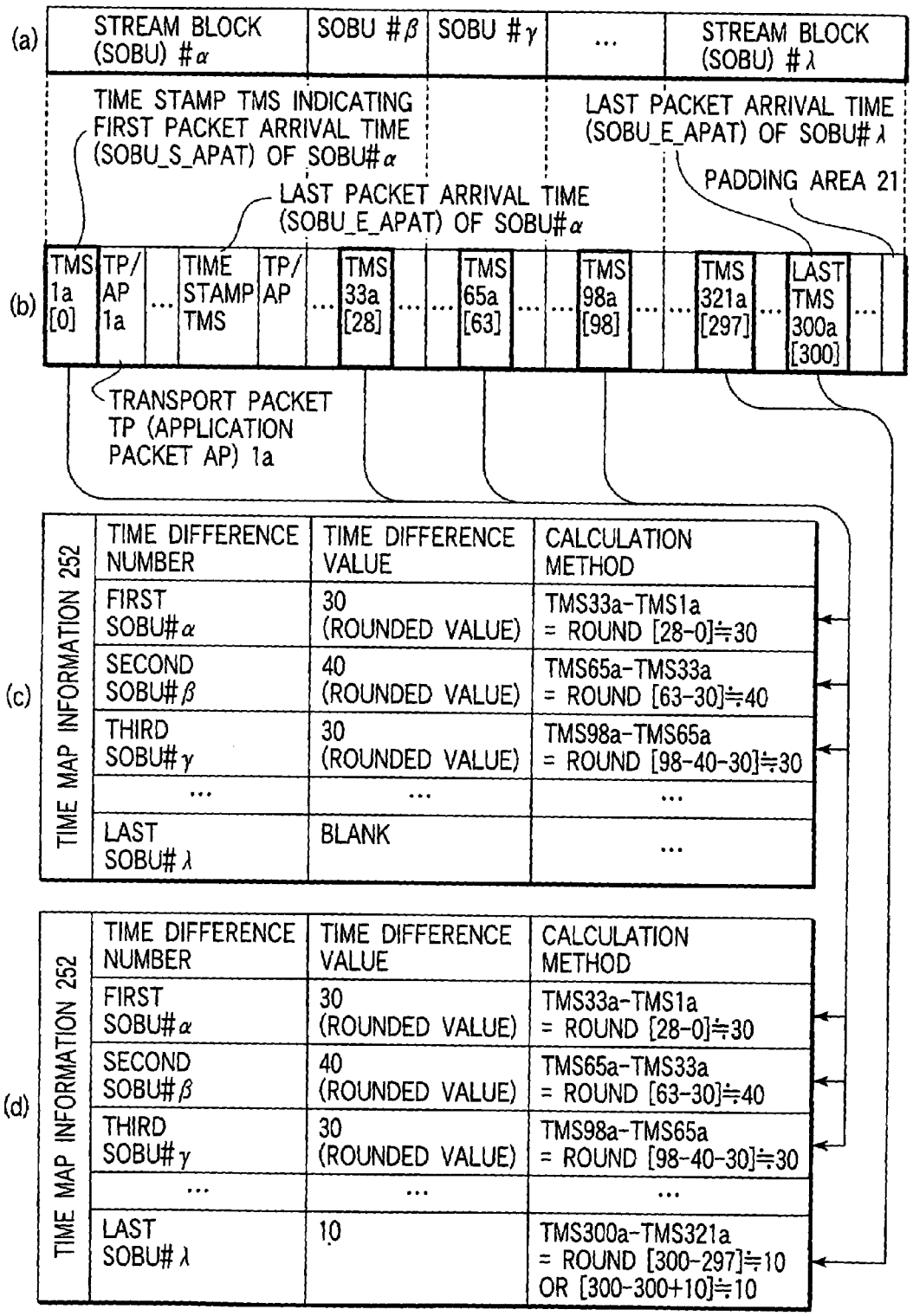
FIG. 8 is a view for explaining the method of setting time map information shown in FIG. 1, etc.

FIG. 8 is a view for explaining the method of setting time map information 252 shown in FIG. 1, etc.

As shown in FIG. 1 (*g*) or FIG. 8 (*b*), stream data recorded by sequentially packing time stamps (TMS) and transport packets (TP) (or application packets AP) are segmented in units of two ECC blocks (32 sectors) to form stream blocks (SOBUs) #α, #β, #γ, . . . , #λ, as shown in FIG. 8 (*a*).

Time stamp (TMS) 1*a* is allocated at the head position of stream block (SOBU) #α. This time stamp 1*a* indicates the arrival time (SOBUSAPAT) of the first packet of SOBU#α. The value [0] of this time stamp 1*a* is used as the start time of SOBU#α.

For other stream blocks (SOBU#β to SOBU#λ), the values ([28], [63], [98], [297]) of time stamps 33*a*, 65*a*, 98*a*, . . . , 321*a* located at the head positions of these stream blocks under the condition that they did not start in the previous sectors are used as the start times of the respective stream blocks (SOBU#β to SOBU#λ).

Last time stamp 300*a* immediately before the last packet in each stream block, e.g., last SOBU#λ, indicates the arrival time (SOBU_E APAT) of the last packet of SOBU#λ. The value [300] of this time stamp 300*a* is used as the end time of SOBU#λ.

When a blank area is formed at the end of last SOBU#λ, this blank area is set as padding area 21 having no actual data (see FIG. 1 (*k*) or FIGS. 6 (*h*) and (*i*)).

Assume that the start times of the respective stream blocks (SOBU#α to SOBU#λ) are respectively 0, 28, 63, 98, . . . , 297, as shown in FIG. 8 (*b*). These times are indicated by one of (a) seconds, (b) the number of fields or frames/pictures (e.g., 30 pictures/sec or 60 fields/sec for NTSC; 25 pictures/sec or 50 fields/sec for PAL), and (c) a count value based on reference clocks of 27 MHz or 90 kHz.

In the example shown in FIGS. 8 (*a*) and (*b*), the elapsed time of the first stream block (SOBU#α) is [28]-[0]=[28] (the number of effective digits=2). However, since no practical problem is posed if a coarser expression of the elapsed time is used, the units digit is rounded (the retained digit is increased by one) to [30].

The elapsed time of the second stream block (SOBU#β) is [63]-[30] if the rounded result [30] is used. Likewise, the units digit is rounded (the retained digit is increased by one) to [40]. Similarly, the elapsed times of the subsequent stream blocks (SOBU#γ to SOBU#λ) are expressed by numerical values rounded to the number of effective digits=1 (the retained digit is increased by one).

Note that since a stream block after the stream block (SOBU#λ) is not accessed, the time difference value for the last stream block is blank, as shown in FIG. 8 (*c*).

FIG. 8 (*c*) shows the relationship between the rounded results and time map information 252.

Since there is no stream block after the stream block (SOBU#λ), a similar differential time computation with another stream block cannot be done. Hence, this embodiment allows the following method for only the last stream block (SOBU#λ). That is, the difference between the value of the last time stamp recorded therein (the value [300] of time stamp 300*a* in the example in FIG. 8 (*b*)) and the value of the first time stamp value recorded in the last stream block (SOBU#λ) (the value [297] of time stamp 321*a* in the example in FIG. 8 (*b*)) is calculated, and its rounded value is set as the time difference value. FIG. 8 (*d*) shows this example.

Note that the time difference value of last SOBU#λ in FIG. 8 (*d*) can be calculated by two methods. In the first method, the value [300] before rounding of last time stamp 300*a* (SOBU_E_APAT of SOBU#λ) and the value [297] before rounding of first time stamp 321*a* are used, and the time difference value [10] is calculated by rounding their difference [3]. In the second method, the rounded value [300] of last time stamp 300*a*, and the rounded value [300] of first time stamp 321*a* are used, and the time difference value [10] is calculated by adding a round error [10] to their difference [0].

In the second method, [0] at the units digit of each numerical value may be removed to obtain a numerical value having the number of effective digits=1, and a round error [1] may be used to remove units digits of other numerical values.

Figure 9:
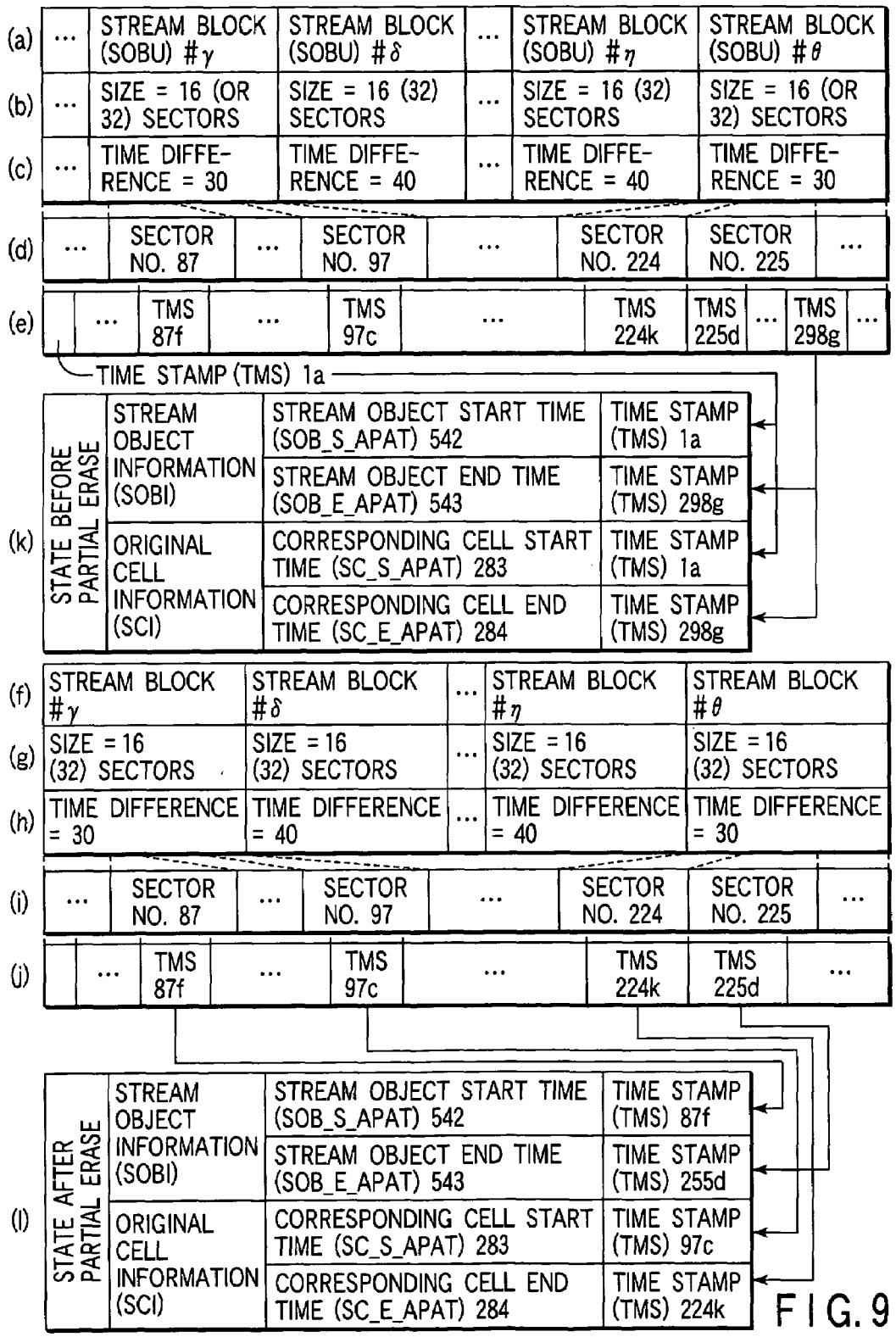
FIG. 9 is a view for explaining changes in stream object information and original cell information before and after the recorded stream object is partially erased.

FIG. 9 is a view for explaining changes in stream object information and original cell information before and after the recorded stream object is partially erased.

A series of information description methods mentioned above can be applied to a partially erased stream object. FIG. 9 (*k*) shows a state before partial erase, and the stream data structure that pertains to a stream object, original cell range, and stream object range immediately after recording (SOB#B•299 in FIG. 1 (*h*), etc.) are shown in FIG. 9 (*a*) to (*e*).

The process after portions before and after the range from time stamps 97*c* to 224*c* as an actual display range are partially erased will be explained below.

In this embodiment, partial erase is done in units of sectors. However, in order to play back another stream object immediately after a stream object after partial erase is played back, and to attain seamless playback without disturbing images at the boundary of these stream objects, partial erase must be done while holding the GOP boundary position of an MPEG bitstream.

Assume that the I-picture head position immediately before transport packet 97*c* corresponding to time stamp 97*c* is present in transport packet 87*f*, as indicated by a second entry point position 532 in FIG. 7 (*a*). In this case, sector No. 87 including transport packet 87*f* is left, all sectors before that sector are erased, and the value of this time stamp 87*f* is set to be stream object start time (SOB_S_APAT) 542 (see FIG. 9 (*l*)) of the stream object before partial erase.

As a result, the size of stream block #γ decreases from 32 sectors to 30 sectors.

At the same time, the value of the stream block time difference described in time map information 252 in correspondence with the block size decreases from, e.g., 40 to 30. Since the boundary positions among stream blocks #δ to #η remain unchanged before and after partial erase, the information contents in time map information 252 which pertain to that portion remain the same.

If the I-picture head position starts from transport packet 225e (not shown in FIG. 7), sectors up to sector No. 225 in FIG. 9 (*i*) that includes transport packet 225d are left, and all sectors after that sector are erased.

Stream object end time (SOB_E_APAT) 543 in FIG. 9 (*j*) can be set by time stamp 225d of transport packet 225d.

Corresponding cell start time (SC_S_APAT) 283/end time (SC_E_APAT) 284 after partial erase are respectively set by time stamps 97c and 224k in correspondence with the actual designation range of partial erase, as shown in FIG. 9 (*i*).

A characteristic feature of this embodiment lies in that time map information (or stream object information SOBI/original cell information SCI) is generated by such method.

Note that the start time and/or end time before and after partial erase change or changes, but the SOBU size remains unchanged (e.g., fixed at 64 k bytes for 32 sectors).

Partial erase may be done in units of SOBUs. In this case, first (or last) time stamp TMS in an original cell is included in the first (or last) SOBU in an SOB.

FIG. 10 is a view for explaining the data structure of a stream pack shown in FIG. 5, etc.

Each stream pack has a data structure shown in FIG. 10 (*d*). One stream pack is formed by 14-byte pack header 11, 6-byte PES header 601, a 1-byte substream ID, a 9-byte application header, an application header extension (option) which is used as needed, a stuffing byte (option) which is used as needed, and an application packet group including one or more application packets each appended with application time stamp ATS (see FIG. 6 (*f*)).

Pack header 11 contains pack start code information, system clock reference (SCR) base information, SCR extension information, program multiplexing rate information, pack stuffing length information, and the like, as shown in FIG. 10 (*g*). The SCR base consists of 32 bits, and its 32nd bit is zero. As the program multiplexing rate, for example, 10.08 Mbps are used.

The PES header includes packet start code prefix information, stream ID (private stream 2) information, and PES packet length information, as shown in FIG. 8 (*f*).

The substream ID has contents for specifying stream recording data, as shown in FIG. 8 (*f*). More specifically, substream ID="0000000010b" indicates that data stored in that stream pack is stream recording data. When this stream ID is "10111110b", it indicates that the stream pack of interest is used as a padding packet (see FIG. 6 (*g*)).

The application header in FIG. 10 (*d*) includes version information, the number AP_Ns of application packets, time stamp position FIRST_AP_OFFSET of the first application packet, extension header information EXTENSION_HEADER_IFO, service ID, and the like, as shown in FIG. 10 (*c*).

Note that the version describes the version number of the application header format.

AP_Ns in the application header describes the number of application packets that start within the stream pack of interest. If the stream pack of interest stores the first byte of ATS, it is determined that an application packet starts in this stream pack.

FIRST_AP_OFFSET describes the time stamp position of the first application packet that starts within the stream packet of interest as a relative value (unit: byte) from the first byte in this stream packet. If no application packet starts within the stream packet, FIRST_AP_OFFSET describes "0".

EXTENSION_HEADER_IFO describes whether or not an application header extension and/or stuffing byte are/is present within the stream packet of interest.

If the contents of EXTENSION_HEADER_IFO are 00b, it indicates that neither the application header extension nor stuffing byte are present after the application header.

If the contents of EXTENSION_HEADER_IFO are 10b, it indicates that the application header extension is present after the application header, but no stuffing byte is present.

If the contents of EXTENSION_HEADER_IFO are 11b, it indicates that the application header extension is present after the application header, and the stuffing byte is also present after the application header extension.

The contents of EXTENSION_HEADER_IFO are inhibited from assuming 01b.

The stuffing byte (option) before the application packet area is activated by "EXTENSION_HEADER_IFO=11b". In this manner, "packing paradox" can be prevented when the number of bytes in the application header extension is contradictory to the number of application packets that can be stored in the application packet area.

SERVICE_ID describes the ID of a service that generates the stream. If this service is unknown, SERVICE_ID describes 0x0000.

FIRST_AP_OFFSET in FIG. 10 (*c*) corresponds to first access point 56 in FIG. 10 (*b*) or FIG. 1 (*a*). This first access point 56 is stored in search information 42 (see FIG. 1 (*b*)) in the pack header (or application header), as shown in FIG. 10 (*a*).

The stuffing byte and application packet group in FIG. 10 (*d*) form an application packet area, as shown in FIG. 6 (*f*). A partial application packet is recorded at the head position of this application packet area. After this packet, a plurality of pairs of application time stamps ATS and application packets are sequentially recorded. At the end of the application packet area, a partial application packet (or stuffing area with the reserved number of bytes) is recorded, as shown in FIG. 5 (*h*).

In other words, a partial application packet can be present at the start position of the application packet area, and a partial application packet or a stuffing area with a reserved number of bytes can be present at the end position of the application packet area.

The application time stamp (ATS) allocated before each application packet consists of 32 bits (4 bytes). This ATS can be divided into two fields, i.e., a basic field and extended field. The basic field is called a 90-kHz unit value, and the extended field indicates a less significant value measured at 27 MHz.

In FIG. 10 (*d*), the application header extension can be used to store information which can differ between application packets. Such information is not always required for all applications. Therefore, the data field of the application header is defined to be able to describe the presence of the application header extension as an option in the stream data area (in EXTENSION_HEADER_IFO mentioned above).

Upon recording a stream, the first byte of application time stamp ATS of the first application packet must be aligned to the start position of the application packet area in the first stream packet at the beginning of stream object SOB.

On the other hand, as for the subsequent stream packet in the SOB, an application packet may be segmented (split) at the boundary of neighboring stream packets.

Two transport packets 1*k* shown in FIG. 1 (*g*) or partial application packets shown in FIGS. 5 (*h*) and (*i*) indicate application packets formed by this segmentation (split).

The byte offset of the first application time stamp that starts within the stream packet and the number of application packets which start within that stream packet are described in the application header. With this format, stuffing before the first application time stamp and after the last application packet is automatically done in a given stream packet.

That is, the automatic mechanism allows "the application to make stuffing by itself". With this automatic stuffing, a stream packet can always have a required length.

The application header extension (option) consists of a list of entries. The list includes one entry having a 1-byte length corresponding to each application packet that starts within the stream packet of interest. The bytes of these entries can be used to store information which may differ in units of application packets.

Note that the 1-byte application header extension (option) describes 1-bit AU_START, 1-bit AU_END, and 2-bit COPYRIGHT, as shown in FIG. 10 (*e*).

When AU_START is set at "1", it indicates that a related application packet includes a random access entry point (start of a random access unit) within the stream. When AU_END is set at "1", it indicates that a related application packet is the last packet of the random access unit. COPYRIGHT describes the state of copyright of a related application packet.

The packet structure shown in FIG. 10 can be applied to sectors other than the last sector of the stream object (SOB) of interest, but cannot always be applied to the last sector. The packet structure shown in FIGS. 6 (*i*) and (*j*) is applied to the last sector.

Figure 11:
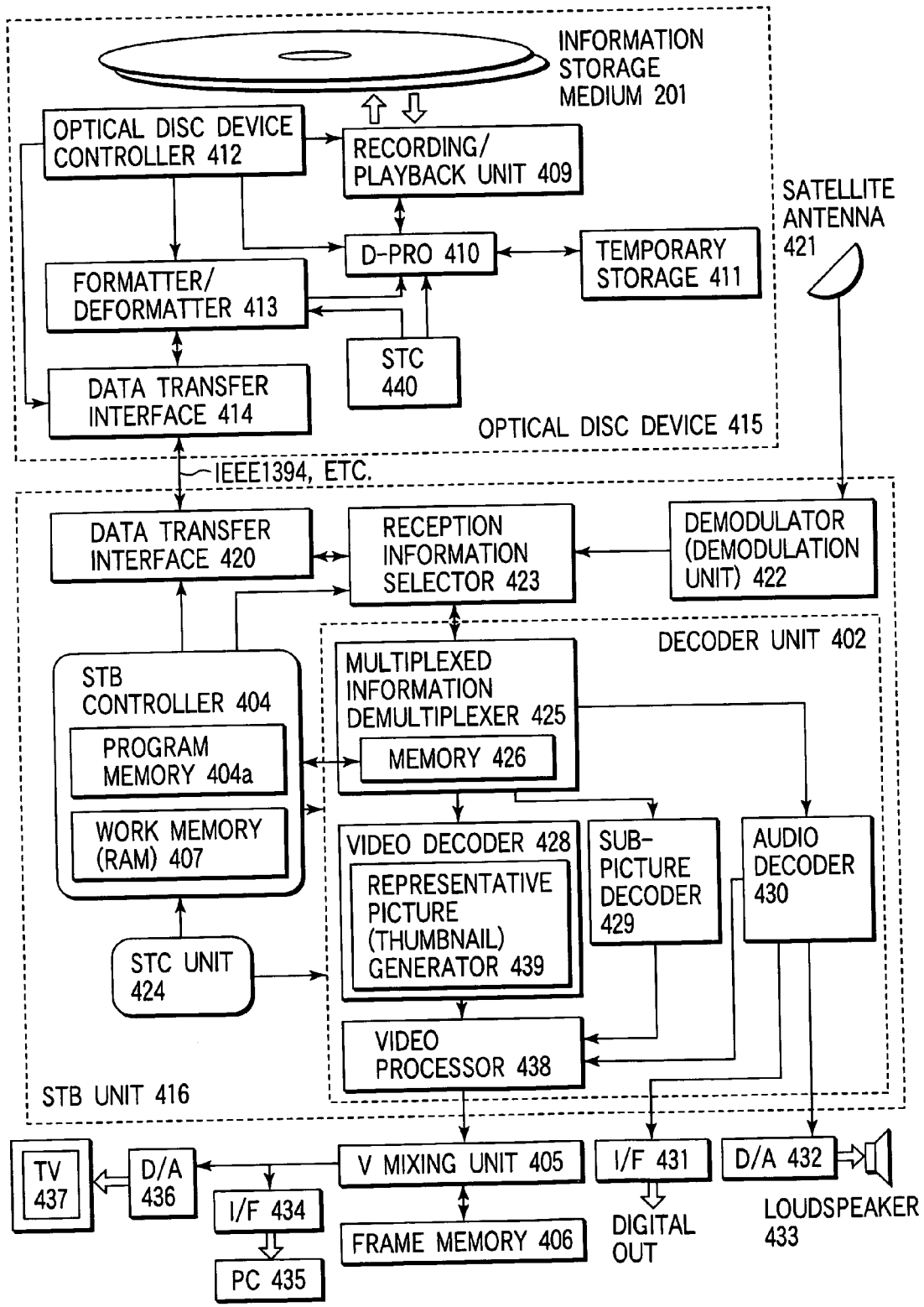
FIG. 11 is a block diagram for explaining the arrangement of a stream data recording/playback system (optical disc device/streamer, STB unit) according to an embodiment of the present invention.

FIG. 11 is a block diagram for explaining the arrangement of a stream data recording/playback system (optical disc device/streamer, STB unit) according to an embodiment of the present invention. This embodiment assumes as information storage medium 201 a recordable/reproducible optical disc such as a DVD-RAM disc or the like.

The internal structure of the stream data recording/playback apparatus according to an embodiment of the present invention will be described below using FIG. 11.

This stream data recording/playback apparatus comprises optical disc device 415, STB unit 416, and their peripheral devices.

The peripheral devices include video mixing unit 405, frame memory 406, external loudspeaker 433, personal computer (PC) 435, monitor TV 437, D/A converters 432 and 436, I/F units 431 and 434, and the like.

Optical disc device 415 comprises recording/playback unit 409 including a disc drive, data processor (to be abbreviated as D-PRO hereinafter) 410 for processing stream data to recording/playback unit 409 (or stream data from recording/playback unit 409), temporary storage 411 for temporarily storing stream data that overflows from D-PRO 410, and optical disc device controller 412 for controlling operations of recording/playback unit 409 and D-PRO 410.

Optical disc device 415 further comprises data transfer interface 414 for receiving stream data sent from STB unit 416 via IEEE1394 or the like (or sending stream data to STB unit 416 via IEEE1394 or the like), and formatter/deformatter 413 for converting the stream data received by data transfer interface 414 into a signal format that can be recorded on information storage medium (RAM disc) 201 (or converting the stream data played back from medium 201 into a signal format for, e.g., IEEE1394 or the like).

The IEEE1394 reception side of data transfer interface 414 reads the time from the start of stream data transfer on the basis of the time count value of reference clock generator (system time counter STC) 440.

Based on the time information, delimiter information for dividing stream data in units of stream blocks (or in units of SOBUS) is generated, and cell division information, program division information, and PGC division information are generated in correspondence with this delimiter information.

Formatter/deformatter 413 converts the stream data sent from STB unit 416 into a stream pack sequence (see FIG. 5 (*j*), etc.), and inputs the converted stream pack sequence to D-PRO 410. Each of the input stream packs has a constant size of 2,048 bytes, which is equal to the sector size. D-PRO 410 combines the input stream packs in units of 16 sectors to form ECC blocks, and sends the ECC blocks to recording/playback unit 409.

When recording/playback unit 409 is not ready to record data on medium 201, D-PRO 410 transfers recording data to temporary storage 411 to temporarily save them therein, and waits until recording/playback unit 409 is ready to record data.

When recording/playback unit 409 is ready to record data, D-PRO 410 transfers data saved in temporary storage 411 to recording/playback unit 409. In this manner, recording on medium 201 is started. Upon completion of recording of data saved in temporary storage 411, the subsequent data are seamlessly transferred from formatter/deformatter 413 to D-PRO 410. Assume that a large-size memory is used as temporary storage 411 so as to store recording data for several minutes or more by high-speed access.

Note that time stamp information appended to the recording bitstream via formatter/deformatter 413 can be obtained from reference clock generator (STC) 440. On the other hand, time stamp information (SCR) extracted from the playback bitstream via formatter/deformatter 413 can be set in STC 440.

Each pack header in the stream data recorded on as information storage medium 201 records a reference clock (system clock reference SCR). When the stream data (SOB or SOBU) recorded on this medium 201 is played back, reference clock generator (STC) 440 is adjusted to the reference clock (SCR) played back from medium 201 (the SCR value is set in STC 440).

That is, in order to play back SOB or SOBU data, the reference clock (STC 440) in the streamer (optical disc device 415) is adjusted to system clock reference SCR described in the first stream pack from which playback starts. After that, STC 440 is automatically counted up.

STB unit 416 comprises demodulator 422 for demodulating the contents of a digital broadcast wave received by satellite antenna 421, and providing demodulated data (stream data) that multiplexes one or more programs, and reception information selector 423 for selecting information of a specific program (of user's choice) (taking FIG. 5 as an example, a transport packet of program 2) from data demodulated by demodulator 422.

When the information (transport packet) of the specific program selected by reception information selector 423 is to be recorded on information storage medium 201, selector 423 sends stream data containing only the transport packet of the specific program to data transfer interface 414 of optical disc device 415 by IEEE1394 transfer via data transfer interface 420 in accordance with an instruction from STB controller 404.

Data transfer interface 414 in optical disc device 415 temporarily converts stream data transferred according to IEEE1394 into the format shown in FIG. 5 (*d*), and pairs of time stamps and transport packets as shown in FIG. 5 (*d*) are packed and recorded in turn on information storage medium 201.

When the user merely reviews the information (transport packet) of the specific program selected by reception information selector 423 without recording it, selector 423 sends stream data containing only the transport packet of the specific program to multiplexed information demultiplexer 425 of decoder unit 402 in accordance with an instruction from STB controller 404.

On the other hand, when a program recorded on information storage medium 201 is to be played back, stream data sent from optical disc device 415 to STB unit 416 via an IEEE1394 serial bus is sent to multiplexed information demultiplexer 425 of decoder unit 402 via selector 423.

Multiplexed information demultiplexer 425 classifies various packets (video packets, audio packets, and sub-picture packets) contained in the stream data sent from selector 423 on internal memory 426 on the basis of their IDs. Then, demultiplexer 425 distributes the classified packets to corresponding decoders (video decoder 428, sub-picture decoder 429, and audio decoder 430).

Video decoder 428 decodes (MPEG-encoded) video packets sent from multiplexed information demultiplexer 425 to generate moving picture data. Video decoder 428 incorporates representative image (thumbnail) generator 439 to provide a function of generating a reduced-scale picture (thumbnail picture) that represents the recorded contents from I-picture in MPEG video data in such case.

Moving picture data (and/or the representative image generated by generator 439) decoded by video decoder 428, sub-picture data (information of superimposed dialogs, menus, and the like) decoded by sub-picture decoder 429, and audio data decoded by audio decoder 430 are sent to video mixing unit 405 via video processor 438.

Video mixing unit 405 generates a digital video by superposing the superimposed dialogs and the like on the moving picture using frame memory 406. This digital video is converted into an analog video via D/A converter 436, and the analog video is sent to monitor TV 437.

Also, the digital video from video mixing unit 405 is fetched as needed by personal computer 435 via I/F unit 434 and a signal line such as IEEE1394 or the like.

On the other hand, digital audio information decoded by audio decoder 430 is sent to external loudspeaker 433 via D/A converter 432 and an audio amplifier (not shown). Also, decoded audio information is digitally output to an external device via I/F unit 431.

Note that the operation timing in STB unit 416 is determined by clocks from system time counter (STC) 424.

The aforementioned instructions, etc., from STB controller 404 (operation control of the internal components of STB unit 416) are executed by a control program stored in program memory 404*a*. In this case, work memory 407 is used as needed in the control process of STB controller 404.

The internal operation timings of STB unit 416 including STB controller 404 and decoder unit 402 can be restricted by clocks from STC unit 424. By synchronizing STC 440 of optical disc device 415 with STC unit 424 of STB unit 416, the operation timings of the overall streamer system including optical disc device 415 and STB unit 416 can be restricted.

As a method of synchronizing STC 440 with STC unit 424, a method of setting STC 440 and STC unit 424 using a reference clock (SCR) in stream data exchanged between data transfer interfaces 414 and 420 is available.

In optical disc device 415 (streamer) in FIG. 11, pairs of time stamps and transport packets (FIGS. 5 (*h*) and (*i*)) are recorded on information storage medium 201 as they are.

When the user instructs to record, for example, the second program in FIG. 5 (*c*) on an information storage medium (201 in FIG. 3 (*a*)), reception information selector 423 in STB unit 416 shown in FIG. 11 extracts only transport packets b and e of program 2. At that time, STB unit 416 appends reception time information of transport packets b 522 and e 525 in the form of time stamps 331 and 332, as shown in FIG. 5 (*d*).

After that, when data is transferred to formatter/deformatter 413 in FIG. 11 according to the IEEE1394 transfer scheme, the pairs of time stamps and transport packets are transferred while being segmented into small units, as shown in FIG. 5 (*e*).

Formatter/deformatter 413 in FIG. 11 temporarily converts stream data transferred by IEEE1394 from STB unit 416 into the format shown in FIG. 5 (*d*) (corresponding to the format shown in FIG. 1 (*g*)). A bitstream in the format shown in FIG. 5 (*d*) (a stream pack sequence in FIG. 5 (*j*)) is recorded on information storage medium 201. More specifically, in an embodiment of the present invention, pack headers and PES headers which record system clock information and the like are inserted at the head positions of respective sectors (see FIG. 5 (*j*), etc.).

A plurality of time stamps and transport packets (FIG. 1 (*g*)) are packed in data areas (FIG. 1 (*f*)), and one transport packet (packet 1*k* in FIG. 1 (*g*); packet b of program 2 in FIG. 5 (*d*)) is recorded across a plurality of sectors (Nos. 0 and 1 in FIG. 1 (*e*); partial packets in FIGS. 5 (*h*) and (*i*)). This is one feature of the present invention.

Using the data structure that utilizes this feature, a packet having a size larger than the sector size (e.g., 2,048 bytes) can be recorded. This point will be described in more detail below.

Digital broadcast adopts a multi-program compatible multiplexing/demultiplexing scheme called a transport stream, as shown in FIG. 5 (*c*), and one transport packet b•522 often has a size of 188 bytes (or 183 bytes). As described above, one sector size is 2,048 bytes, and each data area (FIG. 1 (*f*)) can record approximately 10 transport packets for digital broadcast even after various header sizes are subtracted. By contrast, in a digital communication network such as ISDN or the like, a long packet having a packet size as large as 4,096 bytes is often transferred.

Using the data structure that utilizes the feature (capable of recording one packet data across a plurality of packets) so that each of data areas 21, 22, and 23 (FIG. 1 (*f*)) can record not only a plurality of transport packets, but also a packet with a large packet size such as a long packet, one packet is recorded across a plurality of data areas. As a result, all packets, i.e., transport packets for digital broadcast, a long packet for digital communications, and the like can be recorded in a stream block without any fractions independently of their packet sizes.

The device arrangement in STB unit 416 shown in FIG. 11 can be functionally divided/categorized into a "reception time management module", "stream data content analysis module", "stream data transfer module", and "time related information generation module".

Note that the "reception time management module" is comprised of demodulator (demodulation unit) 422, reception information selector 423, multiplexed information demultiplexer 425, STB controller 404, and so on. The "reception time management module" receives digital TV broadcast via satellite antenna 421, and records reception times in units of transport packets in the received broadcast information.

The "stream data content analysis module" is comprised of multiplexed information demultiplexer 425, STB controller 404, and so on. This "stream data content analysis module" analyzes the contents of the received stream data, and extracts I-, B-, and P-picture positions and/or PTS values.

The "stream data transfer module" is comprised of multiplexed information demultiplexer 425, reception information selector 423, STB controller 404, data transfer interface 420, and so on. This "stream data transfer module" transfers the stream data to optical disc device 415 while holding differential reception time intervals in units of transport packets.

The "time related information generation module" is comprised of multiplexed information demultiplexer 425, STB controller 404, data transfer interface 420, and so on. The "time related information generation module" generates relationship information between reception time (time stamp) information recorded by the "reception time management module" and display time information (PTS value and/or the number of fields) extracted by the "stream data content analysis module".

The process upon recording stream data in the apparatus shown in FIG. 11 will be explained below. As shown in FIG. 5 (c), a plurality of pieces of program information are time-divisionally multiplexed in a single transponder. Reception information selector 423 extracts a transport packet of only a specific program from that information, as shown in FIG. 5 (d).

The "reception time management unit" temporarily saves the required program information in memory 426 of multiplexed information demultiplexer 425. At the same time, the unit measures reception times in units of transport packets, and appends the measurement values to the respective transport packets as time stamps, as shown in FIG. 5 (d). The appended time stamp information is recorded in memory 426.

The "stream data content analysis unit" analyzes information in the transport packets recorded in memory 426. More specifically, each picture boundary position is extracted from the transport packet sequence, and playback time stamp (PTS) information is also extracted. As described above, there are two different picture boundary position extraction methods, and one of these methods is selected depending on the contents of stream data. Then, the stream data temporarily saved in memory 426 is recorded on information storage medium 201.

Time map information 252 is used to compute a corresponding stream block when STB unit 416 designates a time stamp value as the playback start position. This time map information 252 is recorded as a part of stream object information 243 in STREAM.IFO 105 as a management information recording area for stream data, as shown in FIG. 3 (e) to (h).

As shown in FIG. 3 (i), time map information 252 records only time stamp differential time information of each stream block. Hence, the values of time differences of stream blocks in time map information 252 are summed up in each of stream object information 242 or 243, and comparison must be made to check if this summed-up value has reached the time stamp time designated by STB unit 416. Based on the comparison result, the position of a stream block in a stream object, which block includes the time stamp value that matches the time designated by STB unit 416, is detected.

An embodiment that pertains to partial erase of stream data already recorded on information storage medium 201 will be explained below.

In the stream data recording/playback apparatus, the aforementioned partial erase process is controlled by STB controller 404, and process implementation is done especially by a sequential program named a stream data partial erase controller in that controller 404.

STB controller 404 in FIG. 11 reads information of STREAM.IFO 105 that describes management information (STRI) which pertains to stream data before partial erase, and temporarily saves that information in work RAM memory 407. Upon completion of the partial erase process, sectors to be partially erased are excluded from STREAM.VRO (or SR_TRANS.SRO) 106 in FIG. 2. After that, the management information STRI including SOBI and SCI) is changed to the contents shown in FIG. 9 (l), thus rewriting data in STREAM.IFO 105 in FIG. 2.

The access method "which corresponds to video compression by MPEG, and considers the decode timing of the decoder" will be explained below as that to stream data playback of which is to begin in a stream object.

In an embodiment of the present invention, stream data is transferred from STB unit 416 in isochronous mode and, at the same time, I-picture information is transferred in real time. The transferred information is recorded in the STREAM.VRO 106 file that records stream data, as shown in FIG. 1 (a). In an embodiment of the present invention, this information is also recorded in STREAM.IFO 105 that records management information of stream data.

When STB unit 416 shown in FIG. 11 is to play back and display, e.g., B-picture information 504 in FIG. 7, it informs optical disc device 415 of the value of time stamp 1a corresponding to transport packet 1a which is located at the head position of I-picture information 501 located immediately before B-picture information 504.

Optical disc device 415 detects the sector position from which playback is to start using information of time map information 252 with the structure shown in FIG. 1 or 3, accesses a predetermined position on information storage medium 201, and transfers stream data to be played back to STB unit 416. Decoder unit 402 in STB unit 416 begins to decode from I-picture information 501, and starts display from designated B-picture information 504.

Transport packet 41d (FIG. 7) that records start information of B-picture information 504 records, in its transport packet header 311, information of playback time stamp (presentation time stamp) PTS 304 which indicates the display start time, as shown in FIGS. 5 (a) and (b). Decoder unit 402 reads this PTS 305 to set the playback start time.

The method of extracting the I-picture position by decoder unit 402 in FIG. 11 has been explained. However, some digital TV broadcast station may send each picture position information in the process of transmission. Each picture position information already recorded in the process of transmission will be explained below.

In an embodiment of the present invention, the stream block boundary positions set upon initial recording are maintained even for stream data after partial erase, while the remaining portion is re-defined in a new stream object to have the partially erased portion as a boundary. In this case, the first and last stream blocks in a stream object often have sizes smaller than those of other stream blocks. For this reason, time map information 252 records individual stream block size information, as shown in FIG. 1 (l) or FIG. 3 (i).

This embodiment is not limited to the aforementioned specific example. For example, only the first stream block size information and last stream block size information may be recorded, and only common stream block size information may be recorded for other stream blocks.

Figure 12:
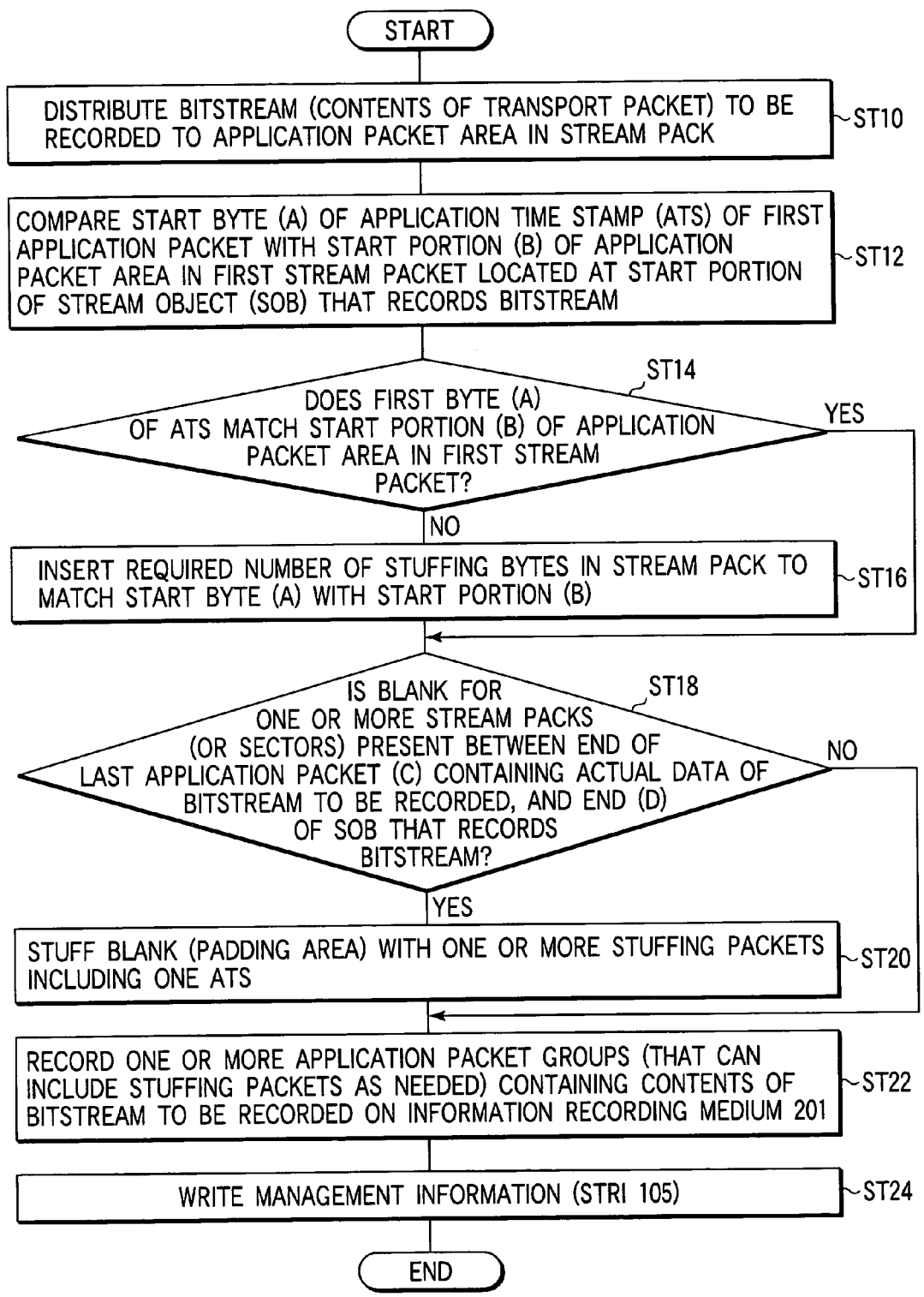
FIG. 12 is a flow chart for explaining the processes of alignment between an application packet and stream object and a padding process at the end of a stream object when information recording of a bitstream is done by the system shown in FIG. 11.

FIG. 12 is a flow chart for explaining the processes of alignment between an application packet and stream object and a padding process at the end of a stream object when information recording of a bitstream is done by the system shown in FIG. 11.

In optical disc device (streamer) 415 in FIG. 11, a bitstream (the contents of a transport packet) to be recorded is distributed to application packet areas in a stuffing packet (step ST10).

The first byte (A) of an application time stamp (ATS) of the first application packet is compared with the start portion (B) of an application packet area in the first stream packet which is located at the start portion of a stream object (SOB) that records a bitstream (step ST12).

If the first byte (A) of the ATS does not match the start portion (B) of the application packet area in the first stream packet (NO in step ST14), for example, a required number of stuffing bytes are inserted in the stream packet to align the first byte (A) with the start portion (B) (step ST16).

If the first byte (A) of the ATS matches the start portion (B) of the application packet area in the first stream packet (YES in step ST14), or after the first byte (A) and start portion (B) are aligned, it is checked if a blank for one stream packet (one sector) or more is present between the end of the last application packet (C) containing actual data of the bitstream to be recorded, and the end (D) of the SOB that records the bitstream (step ST18).

If the blank for one stream packet (one sector) or more is present between the end of the application packet (C) and the end (D) of the SOB (YES in step ST18), this blank is stuffed with one or more stuffing packets including one ATS (step ST20).

If no blank is present between the end of the application packet (C) and the end (D) of the SOB (NO in step ST18), or after the blank between the end of the application packet (C) and the end (D) of the SOB is stuffed with stuffing packets, a group of one or more application packets (that can contain stuffing packets or a stuffing byte area as needed) containing the contents of the bitstream to be recorded is recorded on information medium 201 (step ST22).

After that, a write is made to the management information (STRI) in correspondence with the recorded information (step ST24).

In the recording step ST22, the following process is done as needed.

Figure 19:
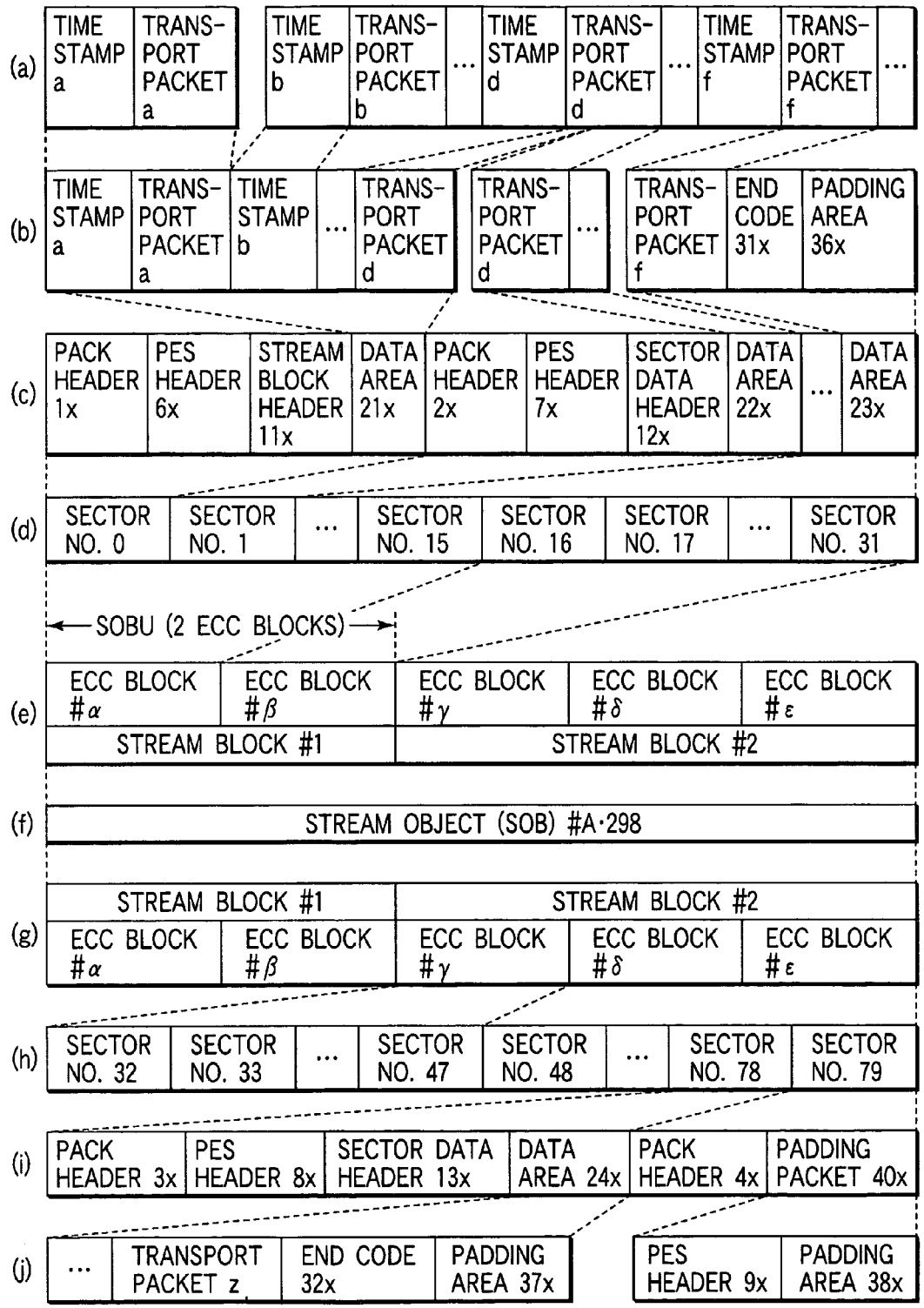
FIG. 19 is a view for explaining the data structure of stream data according to another embodiment of the present invention.

(10) When a blank portion is present at the end of an application packet area, a stuffing area (padding area 37 in FIG. 5 (h) or FIG. 19 (j)) consisting of a predetermined number of bytes is assured in this blank portion (without any time stamp).

In the recording steps ST22 and ST24, the following processes are done as needed.

(11) Stream data (SOB) is formed by a plurality of data units (SOBU#α, . . . , SOBU#λ in FIG. 8 (a)), each data unit (SOBU#α, . . . , SOBU#λ) is formed by one or more data packets (TP/AP in FIG. 8 (b)) that record predetermined time stamp (TMS) information, and the time difference value (rounded value in FIGS. 8 (c) and (d)) corresponding to at least the difference between the first time stamp (TMS 1a) recorded in the first data unit (SOBU#α) and the second time stamp (TMS 33a) recorded in the second data unit (SOBU#β) of a plurality of data units (SOBU#α, . . . , SOBU#λ) is recorded in the management area (STRI or STREAM.IFO/SR_MANGR.IFO).

(12) One or more pieces of cell (FIG. 18) information are recorded in stream data (SOB), program chain (PGC) information (PGCI in FIG. 3 (f) or 13) that describes a group of one or more cells is recorded in the management area (STRI or STREAM.IFO/SR_MANGR.IFO), and entry point (EP) information (SC_EPI) that can be used as a marker of a skip position upon partially skipping the recorded contents of the stream data (SOB) in playback is recorded in the management information (STRI).

(13) Stream object general information (SOBI_GI in FIG. 7 (d) or 15) including at least one of recording time information (SOB_REC_TM) of stream data (SOB), the data packet arrival time (SOB_S_APAT) of the start portion of the stream data (SOB), and the data packet arrival time (SOB_E_APAT) of the end portion of the stream data (SOB) is written in management information (STRI).

Figure 13:
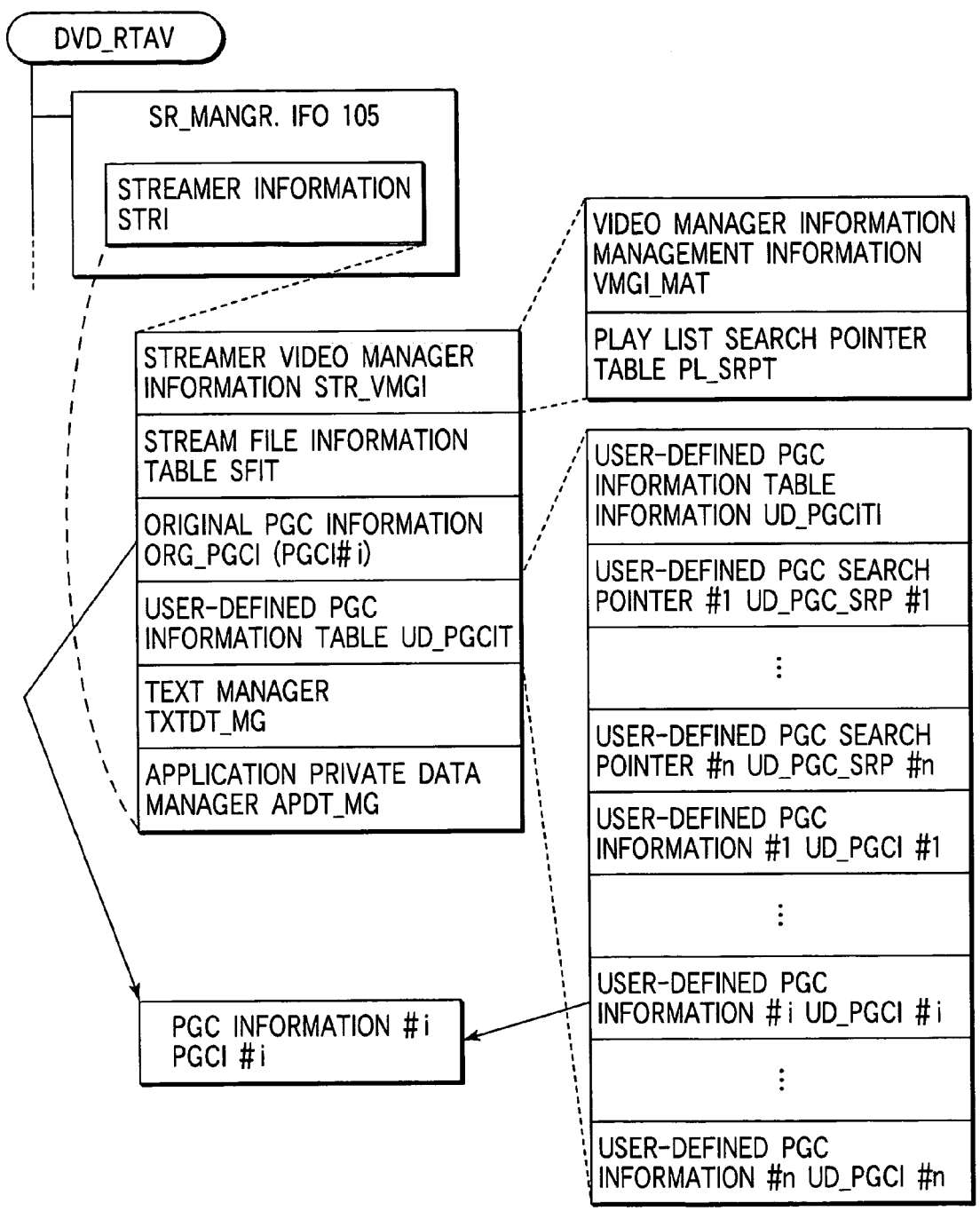
FIG. 13 is a view for explaining the internal data structure of management information (STREAM.IFO in FIG. 2 or 3) of the streamer.

FIG. 13 is a view for explaining the internal data structure of management information (STREAM.IFO or SR_MANGR.IFO in FIG. 2 or FIG. 3) of the streamer.

STREAM.IFO (SR_MANGR.IFO) 105 as management information (navigation data) shown in FIG. 2 or FIG. 3 (e) includes streamer information STRI, as shown in FIG. 13.

This streamer information STRI is comprised of streamer video manager information STR_VMGI, stream file information table SFIT, original PGC information ORG_PGCI (more generally, PGC information PGCI#i), user-defined PGC information table UD_PGCIT, text data manager TXTDT_MG, and application private data manager APDT_MG, as shown in FIG. 3 (f) or FIG. 13.

Streamer video manager STR_VMGI includes video manager information management information VTSI_MAT that describes management information which pertains to STRI and STR_VMGI, and the like, and a play list search pointer table (PL_SRPT) that describes search pointers used to search for a play list in the stream, as shown in FIG. 13.

Note that the play list is a list of portions of a program. With this play list, the user can define an arbitrary playback sequence (for the contents of a program).

Stream file information table SFIT includes all navigation data that directly pertain to the streamer operation. Details of stream file information table SFIT will be explained later with reference to FIG. 15.

Original PGC information ORG_PGCI is a portion that describes information which pertains to an original PGC (ORG_PGC). ORG_PGC indicates navigation data which describes a program set. ORG_PGC is a chain of programs, and includes stream data recorded in a ".SRO" file (SR_TRANS.SRO 106 in FIG. 2) shown in FIG. 2 or FIG. 18 to be described later Note that the program set indicates the entire recorded contents (all programs) of information storage medium 201. Upon playing back the program set, the same playback order as the recording order of programs is used except for a case wherein an arbitrary program has been edited, and the playback order of original recording has been changed. This program set corresponds to a data structure called an original PGC (ORG_PGC).

Also, a program is a logical unit of recorded contents, which is recognized by the user or is defined by the user. A program in the program set is made up of one or more original cells. The program is defined within only the original PGC.

Furthermore, a cell is a data structure indicating a portion of a program. A cell in the original PGC is called an "original cell", and a cell in a user-defined PGC (to be described later) is called a "user-defined cell".

Each program in the program set consists of at least one original cell. A portion of a program in each play list consists of at least one user-defined cell.

On the other hand, only a stream cell (SC) is defined in the streamer. Each stream cell looks up a portion of the recorded bitstream. In an embodiment of the present invention, a "cell" means a "stream cell" unless otherwise specified.

Note that a program chain (PGC) is a generic unit. In an original PGC, PGC indicates a chain of programs corresponding to a program set. On the other hand, in a user-defined PGC, PGC indicates a chain of portions of programs corresponding to a play list.

A user-defined PGC indicating a chain of portions of programs includes navigation data alone. A portion of each program looks up stream data belonging to the original PGC.

User-defined PGC information table UD_PGCIT in FIG. 13 can include user-defined PGC information table information UD_PGCITI, one or more user-defined PGC search pointers UD_PGC_SRP#n, and one or more pieces of user-defined PGC information UD_PGCI#n.

User-defined PGC information table information UD_PGCITI includes UD_PGC_SRP_Ns indicating the number of user-defined PGC search pointers UD_PGC_SRP, and UD_PGCIT_EA indicating the end address of user-defined PGC information table UD_PGCIT (not shown).

The number of "UD_PGC_SRP"s indicated by UD_PGC_SRP_Ns is the same as the number of pieces of user-defined PGC information (UD_PGCI), and is also the same as the number of user-defined PGCs (UD_PGC). The maximum value of UD_PGC_SRP_NS is "99".

UD_PGCIT_EA describes the end address of UD_PGCIT of interest by the relative number of bytes (F_RBN) from the first byte of that UD_PGCIT.

Note that F_RBN indicates the relative number of bytes from the first byte of the defined field, and starts from zero.

PGCI#i that generally expresses original PGC information ORG_PGCI or user-defined PGC information UD_PGCI in user-defined PGC information table UD_PGCIT will be described later with reference to FIG. 14.

Text data manager TXTDT_MG in FIG. 13 is supplementary text information. This TXTDT_MG can be stored in the play list and program together with primary text information PRM_TXTI shown in FIG. 14.

Application private data manager APDT_MG in FIG. 13 can include application private data manager general information APDT_GI, one or more APDT search pointers APDT_SRP#n, and one or more APDT areas APADTA#n (not shown).

Note that application private data APDT is a conceptual area that allows an application device connected to the streamer to store arbitrary non-real time information (more desired information in addition to real-time stream data).

Figure 14:
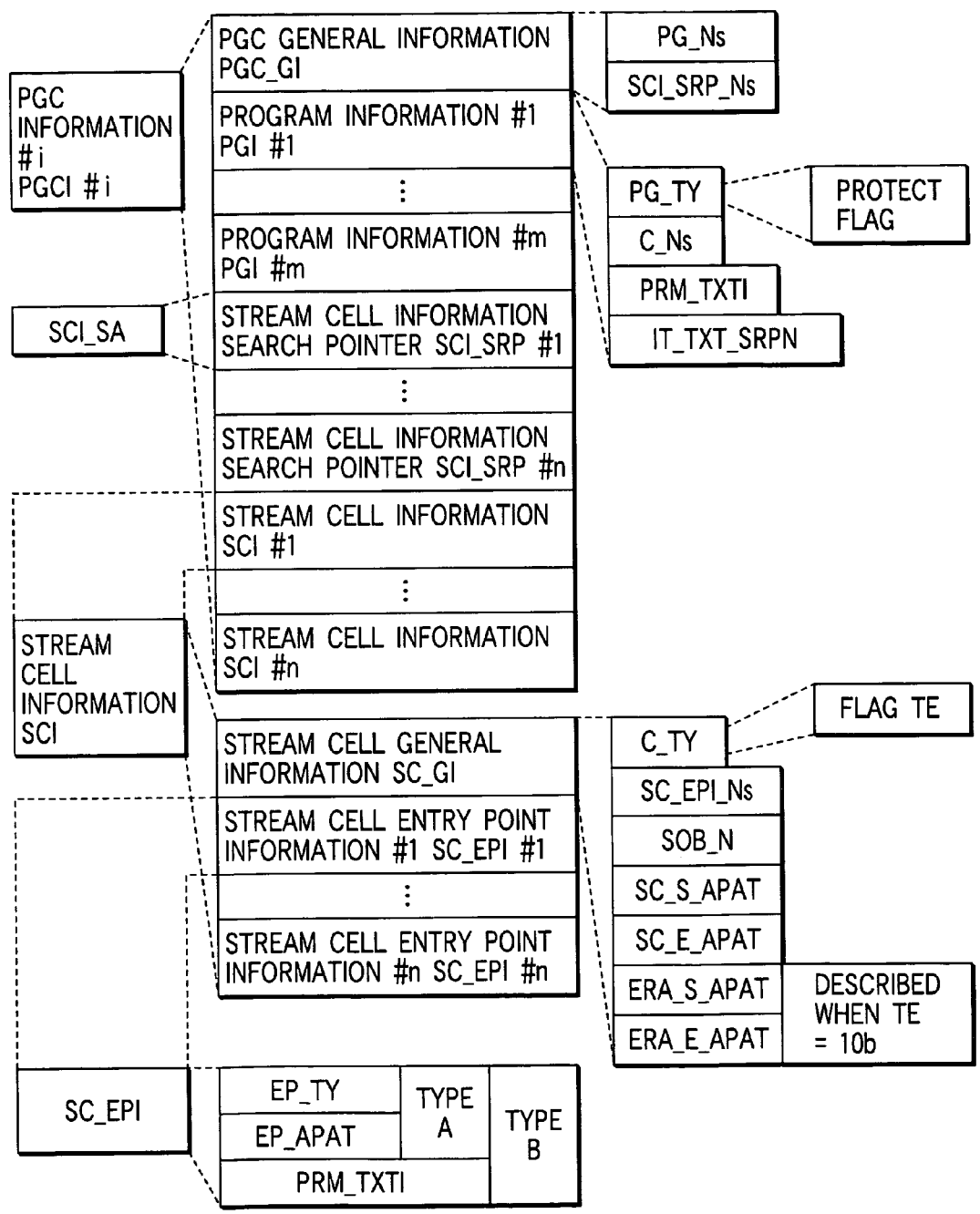
FIG. 14 is a view for explaining the internal data structure of PGC information (ORG_PGCI/UD_PGCIT in FIG. 3 or PGCI#i in FIG. 13)

FIG. 14 is a view for explaining the internal data structure of PGC Information (ORG_PGCI/UD_PGCIT in FIG. 3 or PGCI#i in FIG. 13). PGC information PGCI#i in FIG. 14 generally expresses original PGC information ORG_PGCI or user-defined PGC information UD_PGCI in user-defined PGC information table UD_PGCIT in FIG. 13.

As shown in FIG. 14, PGC information PGCI#i is made up of PGC general information PGC_GI, one or more pieces of program information PGI#m, one or more stream cell information search pointers SCI_SRP#n, and one or more pieces of stream cell information SCI#n.

PGC general information PGC_GI includes the number PG_Ns of programs, and the number SCI_SRP_Ns of stream cell information search pointers SCI_SRP.

Each program information PGI (e.g., PGI#1) includes program type PG_TY, the number C_Ns of cells in the program of interest, primary text information PRM_TXTI of the program of interest, and search pointer number IT_TXT_SRPN of item text.

Note that program type PG_TY includes information indicating the state of the program of interest. Especially, program type PG_TY includes a flag indicating if that program is protected from an erase error, i.e., a protect flag.

When this protect flag is "0b", the program of interest is not protected; when it is "1b", the program is protected.

The number C_Ns of cells indicates the number of cells in the program of interest. In all the programs and cells in a PGC, cells (tacitly) append themselves to each program in their ascending order.

For example, if program #1 in a given PGC has C_Ns=1, and program #2 has C_Ns=2, first stream cell information SCI of that PGC is appended to program #1, and the second SCI and third SCI are appended to program #2.

Primary text information PRM_TXTI describes text information having a single common character set (ISO/IEC646:1983 (ASCII code)) to allow use of information storage medium (DVD-RAM disc) 201 anywhere in the world.

Item text search pointer number IT_TXT_SRPN describes a search pointer number corresponding to item text (text data corresponding to the program of interest) IT_TXT. If the program of interest has no item text, IT_TXT_SRPN is set at "00000h".

Each stream cell information search pointer SCI_SRP (e.g., SCI_SRP#1) includes SCI_SA indicating the start address of corresponding stream cell information SCI. This SCI_SA is described as the relative number of bytes (F_RBN) from the first byte of PGCI.

Each stream cell information SCI (e.g., SCI#1) is made up of stream cell general information SC_GI and one or more pieces of stream cell entry point information SC_EPI#n.

Stream cell general information SC_GI includes cell type C_TY including flag TE indicating a temporary erase (TE) state, the number SC_EPI_Ns of pieces of entry point information of a stream cell, stream object number SOB_N, stream cell start APAT (SC_S_APAT shown in FIG. 9), stream cell end APAT (SC_E_APAT shown in FIG. 9), erase start APAT (ERA_S_APAT) indicating start APAT of a temporary erase cell if that cell is in the temporary erase state (TE=01b), and erase end APAT (ERA_E_APAT) indicating end APAT of a temporary erase cell if that cell is in the temporary erase state (TE=10b).

Cell type C_TY describes the type and temporary erase state of the stream cell of interest.

More specifically, cell type C_TY1="010b" is described in the type of all stream cells (with this C_TY1="010b", a stream cell can be distinguished from other cells).

On the other hand, if flag TE is "00b", it indicates that the cell of interest is in a normal state; if flag TE is "01b" or "10b", that cell is in a temporary erase state.

Flag TE="01b" indicates that the cell of interest (cell in the temporary erase state) starts from a position after the first application packet that starts within a SOBU, and comes to an end at a position before the last application packet in that SOBU.

On the other hand, flag TE="10b" indicates that the cell of interest (cell in the temporary erase state) includes at least one SOBU boundary (the first or last application packets starts within that SOBU).

Note that a protect flag of a program and TE flag of a cell in that program cannot be set at the same time. Therefore, (a) none of cells in a program in the protect state can be set in the temporary erase state; and (b) a program including one or more cells in the temporary erase state cannot be set in the protect state.

The number SC_EPI_Ns of pieces of entry point information of a stream cell describes the number of pieces of stream cell entry point information included in stream cell information SCI of interest.

Each stream cell entry point information SC_EPI (e.g., SC_EPI#1) in FIG. 14 includes two types (types A and B).

SC_EPI of type A includes entry point type EP_TY and entry point application packet arrival time EP_APAT. Type A is set by entry point type EP_TY1 "00b".

SC_EPI of type B includes primary text information PRM_TXTI in addition to EP_TY and EP_APAT of type A. Type B is indicated by entry point type EP_TY1="01b".

As a tool for skipping a portion of the recorded contents in an arbitrary stream cell, an entry point can be used. All entry points can be specified by application packet arrival times (APAT). This APAT can specify the data output start position.

Stream object number SOB_N describes the number of an SOB that the cell of interest looks up.

Stream cell start APAT (SC_S_APAT) describes start APAT of the cell of interest.

Stream cell end APAT (SC_E_APAT) describes end APAT of the cell of interest.

Erase start APAT (ERA_S_APAT) describes the arrival time (APAT) of the first application packet that starts within the first SOBU, the head position of which is included in a given temporary erase cell (TE field of its C_TY is "10b") including at least one SOBU boundary, in that temporary erase cell.

Erase end APAT (ERA_E_APAT) describes the arrival time (APAT) of the first application packet that starts within an SOBU including an application packet which immediately follows a temporary erase cell (TE field of its C_TY is "10b") including at least one SOBU boundary, in that temporary erase cell.

Figure 15:
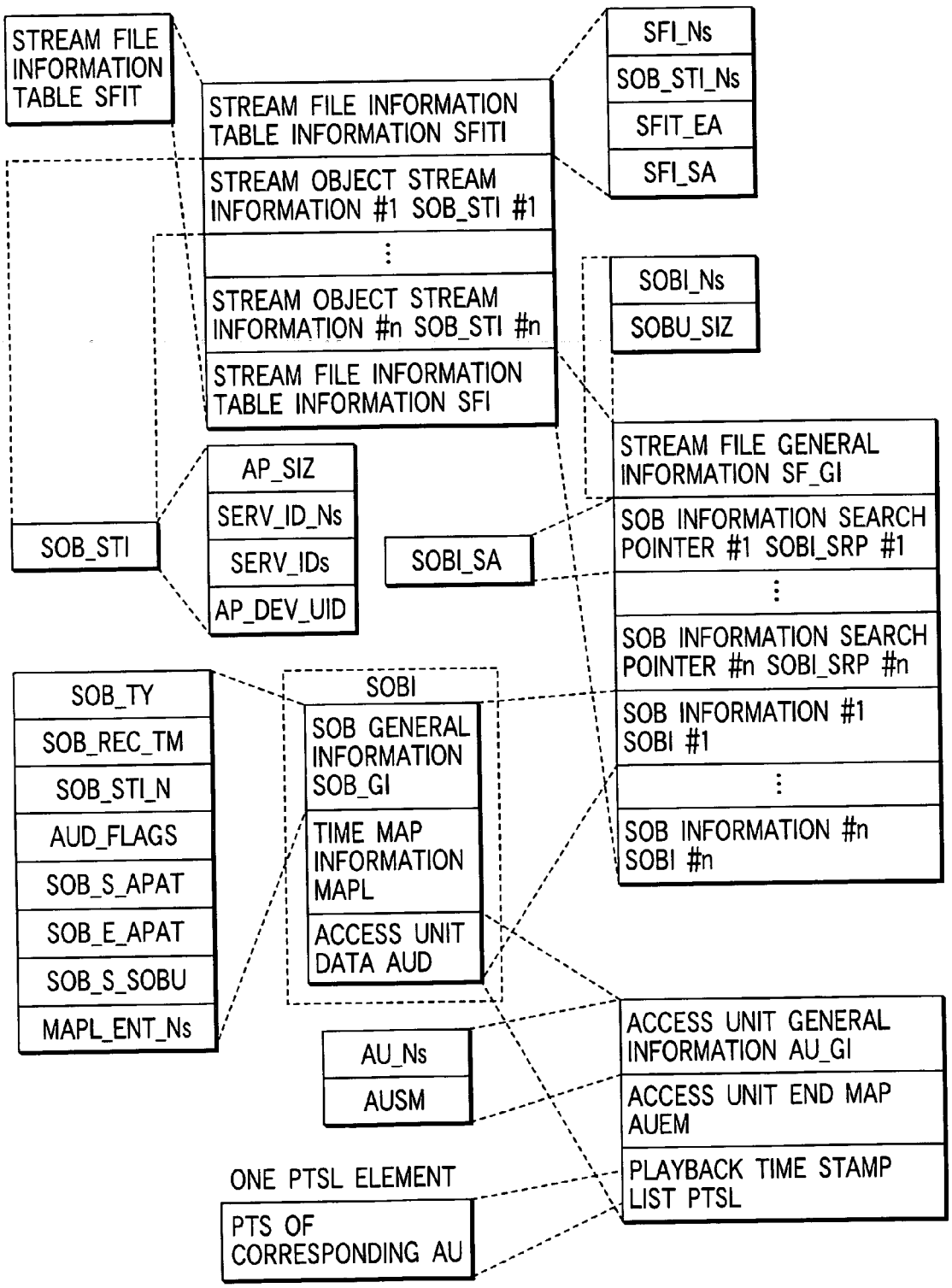
FIG. 15 is a view for explaining the internal data structure of a stream file information table (SFIT)

FIG. 15 is a view for explaining the internal data structure of the stream file information table (SFIT).

As shown in FIG. 15, stream file information table SFIT is made up of stream file information table information SFITI, one or more pieces of stream object stream information SOB_STI#n, and stream file information SFI.

Stream file information table information SFITI consists of the number SFI_Ns of pieces of stream file information on information storage medium (DVD-RAM disc) 201, the number SOB_STI_Ns of pieces of stream object stream information that follow SFITI, end address SFIT_EA of SFIT, and start address SFI_SA of SFI.

SFIT_EA describes the end address of SFIT by the relative number of bytes (F_RBN) from the first byte of SFIT.

SFI_SA describes the start address of SFI by the relative number of bytes (F_RBN) from the first byte of SFIT.

Stream object stream information SOB_STI includes three different parameters. Each parameter can assume a value unique to individual bitstream recording. However, these parameter sets can have equal values in most bitstream recording. Therefore, SOB_STI is stored in a table independently from the table of stream object information (SOBI), and some stream objects (SOB) are allowed to share identical SOB_STI (i.e., point to identical SOB_STI). Therefore, the number of pieces of SOB_STI is generally larger than the number of SOBs.

Each stream object stream information SOB_STI (e.g., SOB_STI#1) in FIG. 15 includes application packet size AP_SIZ, the number SERV_ID_Ns of service IDs, service ID (SERV_IDs), and application packet device unique ID (AP_DEV_UID).

AP_SIZ describes the application packet size by the byte length of a packet in a bitstream transferred from an application device to the streamer.

In the DVD streamer, the application packet size is fixed in each bitstream recording. For this reason, if the application packet size changes in each recording free from any interrupt, the current stream object (current SOB) comes to an end there, and a new stream object (new SOB) starts with new AP_SIZ. In this case, the current and new SOBS belong to an identical program in original PGC information (ORG_PGCI).

SERV_ID_Ns describes the number of service IDS included in the subsequent parameter.

SERV_IDS describes a list of service IDS in an arbitrary order.

AP_DEV_UID describes a unique device ID unique to an application device that supplies the recorded bitstream.

As shown in FIG. 15, stream file information SFI is comprised of stream file general information SF_GI, one or more stream object information (SOB information) search pointers (SOBI_SRP) #n, and one or more pieces of SOB information (SOBI) #n.

Stream file general information SF_GI includes the number SOBI_Ns of pieces of SOBI, and sector size SOBU_SIZ per SOBU.

SOBU_SIZ describes the SOBU size using the number of sectors, and this size is fixed at 32 (32 sectors=64 k bytes). This means that the first entry is associated with an application packet included in the first 32 sectors of an SOB. Likewise, the second entry is associated with an application packet included in the next 32 sectors. The same applies to the third and subsequent entries.

Each SOB information search pointer (e.g., SOBI_SRP#1) includes start address SOBI_SA of SOBI. This SOBI_SA describes the start address of the associated SOBI using the relative number of bytes (F_RBN) from the first byte of stream file information SFI.

Each SOB information (e.g., SOBI#1) is made up of stream object general information SOB_GI, time map information MAPL, and access unit data AUD (option).

Stream object general information SOB_GI includes stream object type SOB_TY, stream object recording time SOB_REC_™, stream object stream information number SOB_STI_N, access unit data flag AUD_FLAGS, stream object start application packet arrival time SOB_S_APAT, stream object end application packet arrival time SOB_E_APAT, start stream object unit SOB_S_SOBU of the stream object of interest, and the number MAPL_ENT_Ns of entries in time map information.

Stream object type SOB_TY is a field that describes bits indicating the temporary erase state (TE state) and/or bits of the copy generation management system.

Stream object recording time SOB_REC_™ describes the recording time of the associated stream object (SOB).

Stream object stream information number SOB_STI_N describes an index of valid SOB STI for the stream object of interest.

Access unit data flag AUD_FLAGS describes whether or not access unit data (AUD) is present for the stream object of interest, and the type of access unit data if it is present.

If access unit data (AUD) is present, AUD_FLAGS describes some properties of AUD.

The access unit data (AUD) itself consists of access unit general information AU_GI, access unit end map AUEM, and playback time stamp list PTSL, as shown in FIG. 15.

Access unit general information AU_GI includes AU_Ns indicating the number of access units described in correspondence with the SOB of interest, and access unit start map AUSM indicating an SOBU that belongs to the SOB of interest and includes an access unit.

Access unit end map AUEM is a bit array having the same length as that of AUSM (if it is present), and indicates an SOBU that includes the terminal end of a bitstream segment appended to the access unit of the SOB of interest.

Playback time stamp list PTSL is a list of playback time stamps of all access units that belong to the SOB of interest. One PTSL element included in this list includes a playback time stamp (PTS) of the corresponding access unit.

Note that the access unit (AU) indicates an arbitrary single, continuous portion of the recorded bitstream, and is suitable for individual playback. For example, in an audio/video bitstream, an access unit corresponds to I-picture of MPEG.

The contents of SOB_GI will be explained again.

AUD_FLAGS includes flag RTAU_FLG, flag AUD_FLG, flag AUEM_FLG, and flag PTSL_FLG.

When flag RTAU_FLG is 0b, it indicates that no access unit flag is present in real-time data of the SOB of interest.

When flag RTAU_FLG is 1b, it indicates that AU flags (AU_START, AU_END) described in the application header extension shown in FIG. 10 (d) can be present in real-time data of the SOB of interest. This state is also allowed when AUD_FLG (to be described below) is 0b.

When flag AUD_FLG is 0b, it indicates that no access unit data (AUD) is present for the SOB of interest.

When flag AUD_FLG is 1b, it indicates that access unit data (AUD) can be present for the SOB of interest.

When flag AUEM_FLG is 0b, it indicates that no AUEM is present in the SOB of interest.

When flag AUEM_FLG is 1b, it indicates that AUEM is present in the SOB of interest.

When flag PTSL_FLG is 0b, it indicates that no PTSL is present in the SOB of interest.

When flag PTSL_FLG is 1b, it indicates that PTSL is present in the SOB of interest.

SOB_S_APAT describes the start application packet arrival time of a stream object. That is, SOB_S_APAT indicates the arrival time of the first application packet that belongs to the SOB of interest.

This packet arrival time (PAT) is divided into two fields, i.e., a basic field and extended field. The basic field is called a 90-kHz unit value, and the extended field indicates a less significant value measured at 27 MHz.

SOB_E_APAT describes the end application packet arrival time of a stream object. That is, SOB_E_APAT indicates the arrival time of the last application packet that belongs to the SOB of interest.

SOB_S_SOBU describes the start stream object unit of the stream object of interest. That is, SOB_S_SOBU indicates an SOBU including the start portion of the start application packet of the stream object.

MAPL_ENT_Ns describes the number of entries in time map information (MAPL) that follows SOBI_GI.

Time map information MAPL has contents corresponding to time map information 252 shown in FIG. 3 (h).

One of relevancies between the contents of FIGS. 13 and 15 is summarized as follows:

Streamer information STRI included in management information 105 contains stream file information table SFIT that manages stream object SOB which forms the contents of stream data. This SFIT includes stream object information SOBI that manages SOB. This SOBI includes access unit general information AU_GI including management information (access unit start map AUSM), and management information (PTSL).

Note that the management information (ATS or AUSM) contains information used upon transferring stream data, and the management information (PTS or SC_S_APAT) contains information used when the stream data is displayed.

Figure 16:
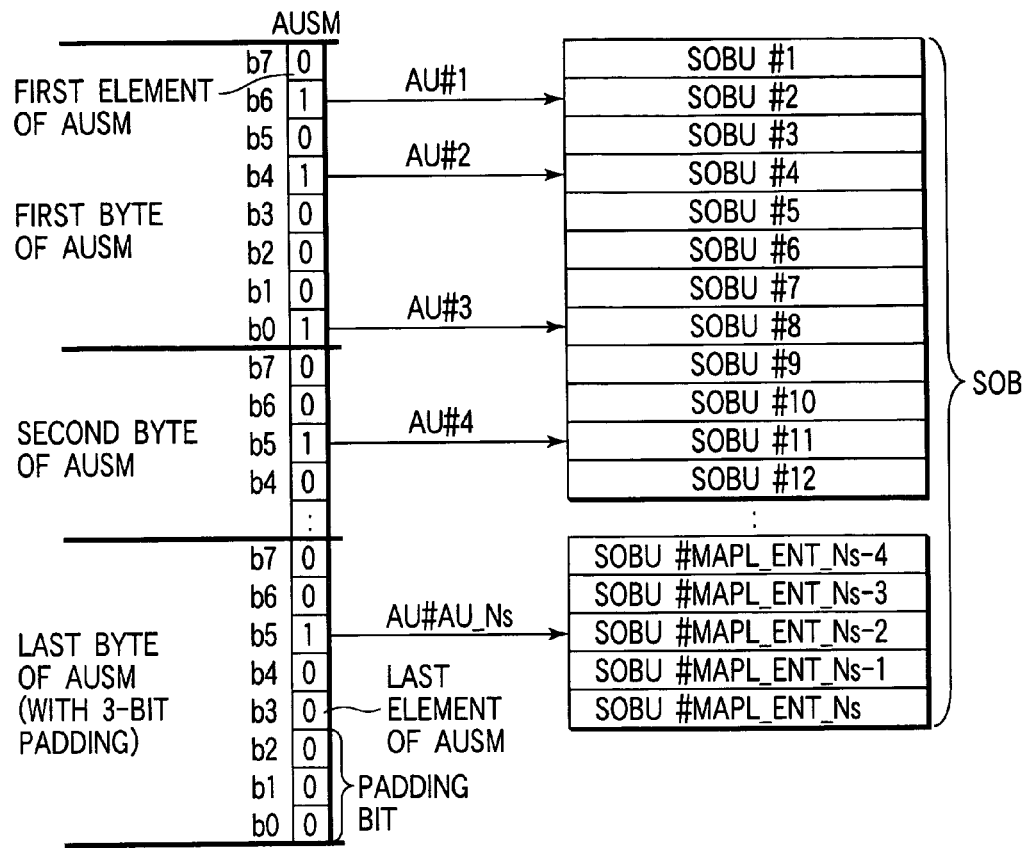
FIG. 16 is a view exemplifying the correspondence between an access unit start map (AUSM) and stream object unit (SOBU)

FIG. 16 is a view exemplifying the correspondence between the access unit start map (AUSM) and stream object unit (SOBU).

As shown in FIG. 16, bit "1" of AUSM indicates that the access unit (AU) is included in the corresponding SOBU.

Assume that AUSM_pos(i) represents the i-th ($1 \leq i \leq AU\_Ns$) bit position where a bit is set in AUSM. Then, the position of access unit AU is as follows.

(1) If SOBU#i indicated by AUSM_pos(i) contains one or more start AUs (described using AU_START and AU_END marks in a stream (if available)), AUSM_pos(i) is assigned to the first AU that starts within SOBU#i. Note that SOBU#i is laid out in SOBUs described using AUSM_pos(i) and AUEM_pos(i) (if AUEM is available).

(2) AU comes to an end at the AU_END mark that appears first after this AU starts, and comes to an end in the last SOBU indicated by the assigned AUEM element (if AUEM is available).

In any access unit data, two or more accessible access units cannot be described per SOBU in an SOB.

Figure 17:
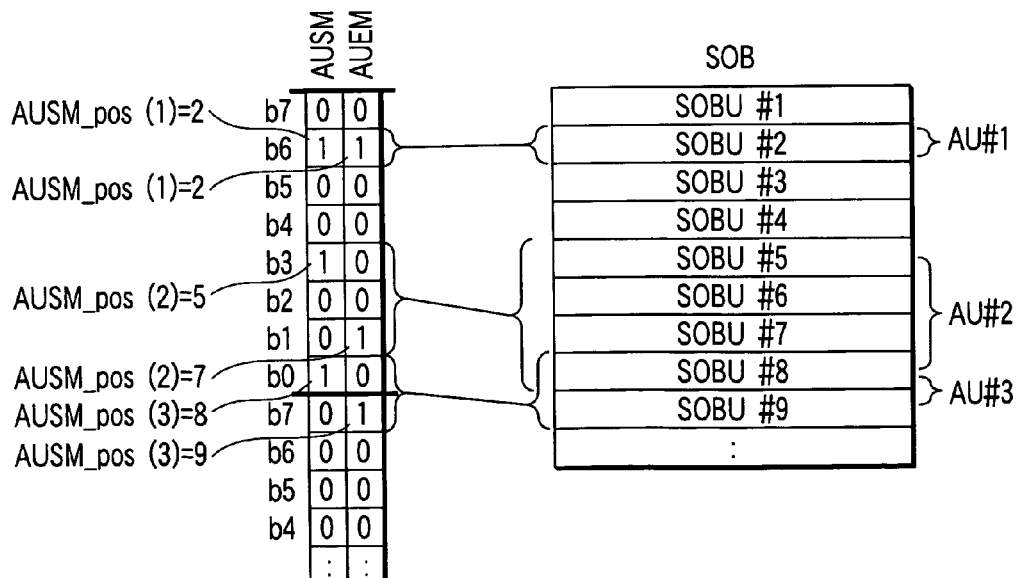
FIG. 17 is a view exemplifying the correspondence between an access unit start map (AUSM) and access unit end map (AUEM), and stream object unit (SOBU)

FIG. 17 is a view exemplifying the correspondence between the access unit start map (AUSM) and access unit end map (AUEM), and stream object unit (SOBU).

AUEM is a bit array having the same length as the AUSM (if available). The bits of AUEM indicate a SOBU that includes the end of a bitstream segment appended to the access unit of the SOB of interest.

The number of bits set in AUEM matches that set in AUSM. That is, the set bits in AUSM have those set in AUEM in correspondence with each other.

Assume that AUSM_pos(i) represents the i-th ($1 \leq i \leq AU\_Ns$) bit position where a bit is set in AUSM, and AUEM_pos(i) the i-th ($1 \leq i \leq AU\_Ns$) bit position where a bit is set in AUEM. In this case, the following relations hold:

(1) $1 \leq AUSM\_pos(i) \leq AUEM\_pos(i) \leq MAPL\_ENT\_Ns$;

(2) $AUSM\_pos(i+1) > AUEM\_pos(i)$;

(3) If $i = AU\_Ns$ or $AUSM\_pos(i+1) > 1$ AUEM_pos(i), AU#i comes to an end in SOBU#[AUEM_pos(i)]($1 \leq i \leq AU\_Ns$); and (4) If $AUSM\_pos(i+1) == 1 + AUEM\_pos(i)$, AU#i comes to an end in SOBU#[AUEM_pos(i)]. Or it comes to an end at the position of SOBU#[1+AUEM_pos(i)]==SOBU#[AUSM_pos(i+1)]. That is, AU#i comes to an end at the beginning of AU#i+1 in SOBU ($1 \leq i \leq AU\_Ns$).

FIG. 18 is a view showing an example of the relationship defined between cells designated by an original or user-defined PGC, and SOBUs corresponding to these cells via time map information.

A user-defined PGC does not contain its own SOB, but looks up an SOB in an original PGC. Therefore, the user-defined PGC can be described using only PGC information. This means that an arbitrary playback sequence can be implemented without modifying SOB data.

The user-defined PGC does not contain any program, and is made up of a chain of cells corresponding to portions of programs in the original PGC.

FIG. 18 shows an example of such user-defined PGC. In this example, user-defined PGC#n is formed so that a cell in the PGC looks up an SOB in an original PGC.

Referring to FIG. 18, PGC#n has four cells #1 to #4. Of these cells, two cells look up SOB#1, and the remaining two cells look up SOB#2.

The solid arrows from cells in the user-defined PGC to the original PGC (time map information of an SOBI) indicate the playback periods of those cells. The cell playback order in the user-defined PGC becomes quite different from that in the original PGC.

Playback of an arbitrary SOB and its SOBUs is specified by start APAT (S_APAT) and end APAT (E_APAT) in FIG. 18.

S_APAT of the SOB or SOBU is defined in association with a time stamp recorded in the payload (see FIG. 5 (*b*)) of a stream pack of the SOB of interest.

During SOB recording, each incoming application packet is appended with a time stamp by the local clock reference in the streamer. This is the application packet arrival time (APAT).

APAT of the start application packet of the SOB is stored as SOB_S_APAT. Four least significant bytes of all APATs are fixed in advance for a corresponding application packet in a "_.SRO" file.

In order to play back data of the SOB or SOBU, the internal reference clock of the streamer is set at an SCR value, and clocks are then automatically counted. This SCR value is described in the first stream pack (pack header) from which playback begins. Based on the clocks, all subsequent application packets are played back and output from the SOB or SOBU.

When an arbitrary stream cell (SC) defines stream cell start APAT (SC_S_APAT) that has an arbitrary value between SOB_S_APAT and SOB_E_APAT of an SOB that SC points to, an address used to find out an SOBU that includes an application packet with a desired APAT is required.

The number of stream packs per SOBU is constant, but the intervals of arrival times captured by SOBUs are flexible. Therefore, each SOB has time map information that describes the arrival time intervals of its SOBUs. That is, the address system implemented by time map information converts arbitrary APAT into a relative logical block address in the file to point to an SOBU that contains a desired application packet.

Entry points (EP#i, EP#k) exemplified in FIG. 18 can be specified by application packet arrival times (APAT) each indicating a data output start position. The application packet arrival time of this entry point is indicated by EP_APAT in FIG. 14.

Using the entry point, upon playback from, e.g., SOBU#1 of cell #1, playback can start from the designated position of SOBU#i while skipping SOBU#2 to SOBU#(i−1).

FIG. 19 is a view for explaining the data structure of stream data according to another embodiment of the present invention.

Stream data recorded on an information storage medium such as a DVD-RAM disc or the like are combined as stream objects (SOB) in units of contents of video information in stream data. Each SOB is formed of stream data obtained by single real-time, continuous recording.

FIG. 19 (*f*) shows one SOB#A•298 of one or more stream objects. When this stream data is recorded on a DVD-RAM disc, each data is recorded using 2,048-byte sectors as minimum units. Furthermore, 16 sectors form one ECC block, and in one ECC block, data are interleaved (the order of data is re-arranged) and a correction code for error correction is appended.

In this embodiment, a stream block is formed by one or a plurality of ECC blocks as a unit, and stream information is recorded or partially erased in units of stream blocks.

In this embodiment, the number of ECC blocks that form a stream block can be determined in accordance with the transfer rate of stream data to be transferred. For example, in an example shown in FIG. 19 (*e*), stream block #1 is formed by two ECC blocks #α and #β, and stream block #2 is formed by three ECC blocks #γ, #δ, and #ε. A DVD streamer forms one stream block (stream object unit SOBU) using two ECC blocks (32 sectors).

Each ECC block is made up of 16 sectors, as shown in FIG. 19 (*d*). Therefore, as can be seen from FIG. 19 (*d*) and (*e*), stream block (or SOBU) #1 made up of two ECC blocks corresponds to 32 sectors (sectors No. 0 to No. 31).

More specifically, if one sector=2 k bytes, a stream block (SOBU) has a fixed size of 64 k bytes (32 sectors) upon practicing the present invention.

The contents of each sector correspond to a stream pack (see FIGS. 5, 6, and 10 for details). For example, a stream pack corresponding to sector No. 0 (FIG. 19 (*d*)) includes pack header 1*x*, PES header 6*x*, stream block header 11*x*, and data area 21*x*, as shown in FIG. 19 (*c*). On the other hand, a stream pack corresponding to sector No. 1 (FIG. 19 (*d*)) includes pack header 2*x*, PES header 7*x*, sector data header 12*x*, and data area 22*x*, as shown in FIG. 19 (*c*).

Data area 21*x* in FIG. 19 (*c*) includes a sequence of pairs of time stamps and transport packets (time stamp a, transport packet a, time stamp b, . . . , transport packet d), as shown in FIG. 19 (*b*). Likewise, data area 22*x* includes another sequence of pairs of time stamps and transport packets. On the other hand, trailing-side data area 23*x* includes transport packet f, end code 31*x*, and padding area 36*x*, as shown in FIG. 19 (*b*).

A plurality of pairs of time stamps and transport packets shown in FIG. 19 (*b*) form a bitstream having a sequence shown in FIG. 19 (*a*).

Stream block #1 (FIG. 19 (*e*)) preceding SOB#A298 (FIG. 19 (*f*)) has a data structure shown in FIG. 19 (*d*) to (*b*), but the data structure of stream block #2 (FIG. 19 (*g*)) succeeding SOB#A•298 is as follows.

That is, trailing-side sector No. 78 (FIG. 19 (*h*)) of end ECC block #E of stream block #2 includes pack header 3*x*, PES header 8*x*, sector data header 13*x*, and data area 24*x*, as shown in FIG. 19 (*i*). Also, last sector No. 79 (FIG. 19 (*h*)) of ECC block #E includes pack header 4*x* and padding packet 40*x*, as shown in FIG. 19 (*i*).

Data area 24*x* of sector No. 78 includes transport packet z, end code 32*x*, and padding area 37*x*, as shown in FIG. 19 (*j*). Padding packet 40*x* of last sector No. 79 includes PES header 9*x* and padding area 38*x*, as shown in FIG. 19 (*j*).

Note that the contents of padding area 37x can be comprised of one or more pairs of time stamps and packets, and a stuffing area with a reserved number of bytes (the stuffing area is appended with no time stamp), as shown in FIG. 5 (h). In this case, no stream data is recorded in the stuffing area.

On the other hand, the contents of padding area 38x can be comprised of an application packet area including stuffing packets (only the first one is appended with application time stamp ATS), as shown in FIGS. 6 (i) and (j).

The present invention can also adopt data structures with the following features:

A) A data structure in which pack headers/packet headers are provided in units of sectors/stream packs, and information required for each sector/stream pack is recorded in a pack header/packet header (see FIG. 1 (a) to (c), FIGS. 5 (a) and (b), and FIG. 10 (a) to (g)).

B) A data structure that records time information which pertains to the time interval at which respective transport packets/application packets are transferred to the decoder on an information storage medium as time stamp information together with the transport packets/application packets (see FIG. 1 (k) to (m) and FIGS. 5 to 10).

C) A data structure that packs and records time stamps and transport packets/application packets at locations other than pack headers/packet headers in a sector/stream pack. A data structure that allocates and records one of a time stamp and transport packet/application packet to a position in the neighboring sector/stream pack when the division (or cutting portion) of the time stamp or that of stream data recorded in units of transport packets/application packets is different from the boundary position of the sector/stream pack (see FIG. 1 (d) to (g) and FIG. 5 (e) to (j)).

D) A data structure which defines a group of videos obtained by single recording of the user or the like as a stream object (SOB), and defines an area after the position of the last transport packet/application packet as a padding area only within a sector/stream pack of interest when the position of the last transport packet/application packet (the position of the last transport packet/application packet in a single stream object) recorded on an information storage medium in single video recording is different from the boundary position of a sector/stream pack (see FIGS. 1 (g) and (k), FIG. 6 (g) to (j), and FIG. 19 (j)).

E) A data structure which provides, onto an information storage medium, a management file (STREAM.IFO or RTR.IFO) that manages stream data in a file (STREAM.VRO or RTR_MOV.VRO) that records stream data, in addition to that file, so as to facilitate search and/or edit of stream data.

F) A data structure which uses the values of time stamps recorded in the STREAM.VRO file or RTR_MOV.VRO file to identify/designate individual transport packets/application packets in the management file (STREAM.IFO or RTR.IFO) that manages stream data (see FIG. 8 (b) to (d)).

G) A data structure which forms a unit named a stream block (or a data unit called stream object unit SOBU) by combining a plurality of sectors on the management file (STREAM.IFO or RTR.IFO), and provides time map information which has time information in units of stream blocks (SOBUs) to the management file, so as to facilitate time search (see FIG. 8 (a) to (d)).

Note that the data sizes of at least the first and last stream blocks (SOBUs) in a stream object may be recorded in the time map information in the management file (STREAM.IFO or RTR.IFO) (see FIG. 3 (i)).

H) A data structure that manages the value of the first time stamp in each stream block (SOBU) (except for a time stamp recorded continuously from the previous stream block) as the start time of each stream block (SOBU) in the management file (STREAM.IFO or RTR.IFO) (see FIG. 8 (a) to (d)).

More specifically, the value of the first time stamp (e.g., TMS 1a in FIG. 8 (b)) in each stream block (SOBU) is recorded in the time map information in the management file.

A stream data recording method according to the present invention uses an information storage medium which can record information in units of first recording units (sectors or stream packs), and records stream data segmented into second recording units (transport packets/application packets).

In a first recording area (stream recording area 222 in FIG. 3 (d)) that records stream data in units of second recording units (transport packets/application packets), packet header (or pack header) information assigned to each first recording unit (sector/stream pack), time stamp information having time information that pertains to stream data of the second recording unit (transport packet/application packet), and stream data in units of second recording units (transport packets/application packets) are recorded.

When the division (or cutting portion) of the time stamp information or that of stream data recorded in units of second recording units (transport packets/application packets) is different from the boundary position of a first recording unit (sector/stream pack), the time stamp information or stream data recorded in units of second recording units (transport packets/application packets) is recorded across a plurality of first recording units (sectors/stream packs) (see former half 346 of transport packet b of program 2 in FIG. 5 (e), and FIG. 5 (h) to (j)).

In the stream data which is recorded finally on the information storage medium, when the end position of a second recording unit (transport packet/application packet) is different from the boundary position of a first recording unit (sector/stream pack), predetermined data (e.g., all "1" bits or all "0" bits) is recorded as a padding area (21 in FIG. 1 (k) or FIG. 6 (h)) in an area after the end position of the finally recorded first recording unit (sector/stream pack) or second recording unit (transport packet/application packet) (see FIGS. 6 (i) and (j)).

A second recording area (STREAM.IFO or RTR.IFO) that stores management information pertaining to recorded data is recorded in the first recording area (stream recording area 222) (see FIGS. 3 (d) and (e)).

A third recording unit (stream block/SOBU) is formed by collecting a plurality of first recording units (sectors/stream packs) with respect to a third recording area (stream file information) that records time information which pertains to the first recording area (stream recording area 222) (see FIG. 6 (b) to (e) and FIGS. 8 (a) and (b)).

The difference value between pieces of time stamp information allocated at the head positions of the third recording units (stream blocks/SOBUs) with respect to stream data recorded in the first recording area (stream recording area 222) is recorded as time map information (see FIG. 1 (i) to (m) and FIG. 8 (a) to (d)).

Also, an information storage medium having a data structure in which stream data are recorded by the aforementioned method is a characteristic feature of the present invention.

Furthermore, as a method that allows partial erase in units of transport packets in consideration of the I-picture start position, the following method is used.

I) A stream object is newly segmented before and after the partial erase position.

J) Information of stream file information that describes information which pertains to a STREAM.VRO file or RTR_MOV.VRO file that records stream data, and playback unit information (cell information) used upon playback of stream data are stored in a management file (STREAM.IFO or RTR.IFO).

K) A partial erase process is done in units of sectors for the STREAM.VRO file or RTR_MOV.VRO file that records stream data.

L) A stream object is segmented on the management file (STREAM.IFO or RTR.IFO) in accordance with the I-picture start position.

More specifically, stream file information (SOBI_GI•251 in FIG. 7 (d)) stores stream object start time information (SOB_S_APAT 542 in FIG. 7 (c)), and stream object end time information (SOB_E_APAT 543 in FIG. 7 (c)). After partial erase, the value of a time stamp (1a in FIG. 7) corresponding to a transport packet (1a in FIG. 7) that records the I-picture start position is changed (or additionally written) to the value of the stream object start time (SOB_S_APAT 542), and the value of a time stamp (TMS 298g in FIG. 7) corresponding to a transport packet (TP 298g in FIG. 7) that precedes a transport packet which records the I-picture start position immediately after stream data including the partial erase boundary position is changed (or additionally written) to the value of the stream object end time (SOB_E_APAT 543).

M) On the management file (STREAM.IFO or RTR.IFO), the start/end positions in cell information are set in correspondence with transport packets which are designated to undergo partial erase.

More specifically, a partial erase range is designated in units of transport packets. The value of a time stamp (TMS 97c in FIG. 9 (j)) corresponding to a start transport packet of those which fall outside the designated range is set as the corresponding cell start time (SC_S_APAT 283 in FIG. 9 (l)) of a new original cell, and the value of a time stamp (TMS 224k in FIG. 9 (j)) corresponding to the last transport packet is set as the corresponding cell end time (SC_E_APAT 284 in FIG. 9 (l)), thus changing (additionally writing) the contents of the management file (STREAM.IFO or RTR.IFO) accordingly.

An information medium to which the aforementioned partial erase method can be applied is a medium that allows information recording in units of first recording units (sectors). This medium has a first recording area (STREAM.VRO or RTR_MOV.VRO) that records stream data, and a second recording area (STREAM.IFO or RTR.IFO) that records management information which pertains to data recorded in the first recording area. In the first recording area (STREAM.VRO or RTR_MOV.VRO), packet header information assigned to each first recording unit (sector), time stamp information having time information that pertains to stream data of the second recording unit (transport packet), and stream data in units of second recording units (transport packets) are packed and recorded. A third recording unit (stream block) is formed by collecting a plurality of first recording units (sectors). A fourth recording unit is formed by a plurality of third recording units (stream blocks) to indicate a large set of stream data. In the second recording area (STREAM.IFO or RTR.IFO), time information (time map information) for each third recording unit (stream block), and pieces of data size information of the third recording units (stream blocks) at the start and end positions of the fourth recording unit (stream object) are recorded.

Stream data recorded in the first recording unit (STREAM.VRO or RTR_MOV.VRO) can be partially erased in units of first recording units (sectors). After partial erase, a fourth recording unit (stream object) having a new size is formed, and at least one of the data size and time information of the third recording units (stream blocks) at the start and end positions in the fourth recording unit (stream object) having the new size is rewritten or newly recorded in the second recording area (STREAM.IFO or RTR.IFO).

The advantageous effects obtained upon practicing the present invention are summarized as follows.

1. Since time information for each transport packet is recorded, as time stamp information, on the information storage medium together with the transport packet, a) the transfer timing of each transport packet to the STB unit can be detected in correspondence with the time stamp value.

b) Since each transport packet can be transferred to the decoder at the timing corresponding to the time stamp value, decoding and image-displaying can be stably done without any failure even if no buffer is available on the decoder side.

c) Since individual transport packets can be identified and discriminated using the time stamp value, the arrival position upon access and/or the edit range can be easily designated.

2. Time stamps and transport packets are sequentially packed and recorded in the remaining portion of a sector after a packet header is excluded. When the division (or cutting portion) of a time stamp or that of stream data recorded in units of transport packets is different from the boundary position of a sector, either the time stamp or transport packet is recorded to a position being across to the neighboring sector, and a padding area is set in only a sector at the video recording end position (or, the last position of a stream object).

For this reason, stream data can be efficiently recorded on the information storage medium. As a result, stream data divided in units of transport packets can be recorded without decreasing the actual capacity of the information storage medium.

3. Time stamps and transport packets are sequentially packed and recorded in the remaining portion of a sector after a packet header is excluded. When the division (or cutting portion) of a time stamp or that of stream data recorded in units of transport packets is different from the boundary position of a sector, either the time stamp or transport packet is recorded to a position being across to the neighboring sector, and a padding area is set in only a sector at the video recording end position (last position of a stream object).

Since contents of a packet can be recorded across adjacent sectors, a large packet having a size larger than the sector size (2,048 bytes) can be recorded.

4. According to an embodiment of the present invention, a time stamp is not always located immediately after a packet header in each sector. Hence, as a method of extracting time information in units of stream blocks, the embodiment of the present invention may use the value of the first time stamp in each stream block (except for a time stamp recorded to extend from the previous stream block) as the start time of the stream block.

By so doing, time map information in the management file (STREAM.IFO or RTR.IFO) can be generated, and a prescribed transport packet can be easily accessed using this time map information.

5. When stream data in the STREAM.VRO or RTR_MOV.VRO file are allowed to be partially erased in units of sectors, the STREAM.VRO or RTR_MOV.VRO file can be partially released in units of minimum recording units (or, in units of sectors) with respect to an information storage medium such as a DVD-RAM or the like. As a result, sectors released from the STREAM.VRO or RTR_MOV.VRO file can be effectively used to, e.g., record computer data later.

Assume a case wherein partial erase is allowed only in units of stream blocks (SOBUs) as partial erase units different from the above-mentioned case (to partially release the STREAM.VRO or RTR_MOV.VRO file). Under this assumption, even when the user designates partial erase within a range as small as the sector size, part of the STREAM.VRO or RTR_MOV.VRO file cannot be practically released due to too narrow a partial erase range. As a result, the small partial erase range designated by the user cannot be used to record other data, and wasteful areas where information cannot be recorded may increase on the information storage medium in practice. However, the present invention does not exclude use of partial erase in units of SOBUs.

6. A management file (STREAM.IFO or RTR.IFO) that manages stream data in a file (STREAM.VRO or RTR_MOV.VRO) for recording stream data is provided on the information storage medium, in addition to that file, and cell information which records information that pertains to a cell indicating a playback unit upon playback of the stream data is recorded in the management file.

By providing start/end position information associated with that cell as time information corresponding to a time stamp, a transport packet represented by the time stamp value can be designated.

When the start/end position information of the cell is described using time information, a playback range after partial erase can be flexibly designated in units of transport packets.

7. A management file (STREAM.IFO or RTR.IFO) that manages stream data in a file (STREAM.VRO or RTR_MOV.VRO) for recording stream data is provided on the information storage medium, in addition to that file, and stream object start time and stream object end time information are stored in stream file information present in that management file.

After partial erase, the time stamp value corresponding to a transport packet that records the I-picture start position is re-set to the value of the stream object start time. Or, after partial erase, the time stamp value corresponding to a transport packet that precedes a transport packet which records the I-picture start position located immediately after stream data including the partial erase boundary position is re-set to the value of the stream object end time.

By so doing, it is possible to perform partial erase of stream data (or to perform splitting/segmenting the stream data) to have the I-picture start position as the boundary position.

As a result,
a) since the decoder can always start decoding from the I-picture start position, display can start from an arbitrary position in units of frames; and
b) since the I-picture position can always be detected from information of the management file (STREAM.IFO or RTR.IFO), and stream data are split or segmented to have I-picture start positions as boundaries, when a plurality of different stream objects are successively played back, video playback can be seamlessly and continuously made without disturbing images at the division (or change point at cutting portion) of stream objects.

8. When a flag indicating the I-picture position is provided to each of isochronous packet headers 343 and 344, STB unit 416 can inform optical disc device 415 of I-picture position information, in real time, simultaneously with transfer of stream data (transport packets).

As a result, I-picture position information can be easily recorded in the stream data recording file (STREAM.VRO or RTR_MOV.VRO) in real time, and the I-picture position information can also be easily recorded in the management file (STREAM.IFO or RTR.IFO).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information medium having stored thereon stream data of MPEG-TS in accordance with a hierarchical data structure, comprising:

a data area configured to store a stream object corresponding to the stream data, the stream object including one or more stream data units, and the one or more stream data units including one or more pairs of a time-stamp and a transport stream packet; and a management area, located at an area other than said data area, configured to store management information of the stream object, wherein, said management information, which is configured to control when the stream object is to be displayed or reproduced, includes an area configured to store first copy management information of the stream object, the at least one stream data unit stores a second data unit including information of the one or more pairs of said time-stamp and said transport stream packet, said second data unit, stored in at least one of the stream data units, includes a header containing time-related information with respect to the transport stream packet, said second data unit, stored in the at least one stream data unit, includes second copy management information indicating a copyright state of the information of the transport stream packet, a copyright information of the stream object is configured to be managed by said first and second copy management information, and said management area includes information indicating presentation timestamp information items and a corresponding point in the stream data, wherein recording locations of the presentation timestamp information items are configured to be different from those of the transport packets included in said stream blocks.

2. An apparatus for reproducing information from an information medium as defined in claim 1, said apparatus comprising:

a first reproducer configured to reproduce the management information from the management area; and a second reproducer configured to reproduce the stream data from the data area.

3. A method of recording information on an information medium configured to have a data structure comprising a data area configured to store a stream object corresponding to the stream data, the stream object including one or more stream data units, and the one or more stream data units including one or more pairs of a time-stamp and a transport stream packet and a management area, located at an area other than said data area, configured to store management information of the stream object, wherein,
- said management information, which is configured to control when the stream object is to be displayed or reproduced, includes an area configured to store first copy management information of the stream object,
- the at least one stream data unit stores a second data unit including information of the one or more pairs of said time-stamp and said transport stream packet,
- said second data unit, stored in at least one of the stream data units, includes a header containing time-related information with respect to the transport stream packet,
- said second data unit, stored in the at least one stream data unit, includes second copy management information indicating a copyright state of the information of the transport stream packet,
- a copyright information of the stream object is configured to be managed by said first and second copy management information, and
- said management area includes information indicating presentation timestamp information items and a corresponding point in the stream data, wherein recording locations of the presentation timestamp information items are configured to be different from those of the transport packets included in said stream blocks,
- said method comprising:
- recording the stream data on the data area; and
- recording the management information on the management area.

4. A method of reproducing information from an information medium configured to have a data structure comprising a data area configured to store a stream object corresponding to the stream data, the stream object including one or more stream data units, and the one or more stream data units including one or more pairs of a time-stamp and a transport stream packet and a management area, located at an area other than said data area, configured to store management information of the stream object, wherein,
- said management information, which is configured to control when the stream object is to be displayed or reproduced, includes an area configured to store first copy management information of the stream object,
- the at least one stream data unit stores a second data unit including information of the one or more pairs of said time-stamp and said transport stream packet,
- said second data unit, stored in at least one of the stream data units, includes a header containing time-related information with respect to the transport stream packet,
- said second data unit, stored in the at least one stream data unit, includes second copy management information indicating a copyright state of the information of the transport stream packet,
- a copyright information of the stream object is configured to be managed by said first and second copy management information, and
- said management area includes information indicating presentation timestamp information items and a corresponding point in the stream data, wherein recording locations of the presentation timestamp information items are configured to be different from those of the transport packets included in said stream blocks,
- said method comprising:
- reproducing the management information from the management area; and
- reproducing the stream data from the data area.

* * * * *